(12) United States Patent
Matsuura et al.

(10) Patent No.: US 9,118,251 B2
(45) Date of Patent: Aug. 25, 2015

(54) POWER SUPPLY DEVICE

(71) Applicant: TDK Corporation, Minato-ku, Tokyo (JP)

(72) Inventors: Ken Matsuura, Tokyo (JP); Kazunori Oshima, Tokyo (JP); Hiroshige Yanagi, Tokyo (JP)

(73) Assignee: TDK Corporation (JP)

( * ) Notice: Subject to any disclaimer, the term of this patent is extended or adjusted under 35 U.S.C. 154(b) by 240 days.

(21) Appl. No.: 13/956,643

(22) Filed: Aug. 1, 2013

(65) Prior Publication Data

US 2014/0036547 A1    Feb. 6, 2014

(30) Foreign Application Priority Data

Aug. 2, 2012    (JP) .................................. 2012-171663

(51) Int. Cl.
| | |
|---|---|
| *G05F 1/00* | (2006.01) |
| *H02M 3/337* | (2006.01) |
| *H02M 3/335* | (2006.01) |
| *H02M 1/00* | (2007.01) |

(52) U.S. Cl.
CPC ........ *H02M 3/33507* (2013.01); *H02M 3/3376* (2013.01); *H02M 2001/0058* (2013.01); *Y02B 70/1491* (2013.01)

(58) Field of Classification Search
USPC ................... 363/15–17, 21.02, 21.04–21.06, 363/21.12–21.14, 123, 124, 127, 131, 132; 323/234, 237, 241, 265, 282–285
See application file for complete search history.

(56) References Cited

U.S. PATENT DOCUMENTS

| | | | | |
|---|---|---|---|---|
| 7,315,157 | B2 * | 1/2008 | Chapuis ......................... | 323/282 |
| 7,595,686 | B2 * | 9/2009 | Maksimovic et al. ......... | 327/540 |
| 8,077,490 | B1 * | 12/2011 | Prodic et al. .................... | 363/65 |
| 2011/0316510 | A1 * | 12/2011 | Oshima .......................... | 323/282 |

FOREIGN PATENT DOCUMENTS

JP     2006-295802     10/2006

* cited by examiner

*Primary Examiner* — Jeffrey Gblende
(74) *Attorney, Agent, or Firm* — Harness, Dickey & Pierce, P.L.C.

(57) ABSTRACT

A power supply device includes a control unit performing PFM control for a switching element, a voltage detection unit detecting an output voltage of a converter, and a signal generation circuit. The control unit calculates a first control command value based on the output voltage, calculates a new first control command value adjusting the output voltage to a target voltage, calculates a difference value therebetween, and outputs a voltage, which has a polarity corresponding to the difference value, for a first output period corresponding to the difference value. The signal generation circuit generates a pulse signal in which a frequency increases or decreases in accordance with a first command value voltage corresponding to a charged voltage at a storage element according to the new first control command value. The switching element is driven by the pulse signal that has a finer adjustment unit frequency.

4 Claims, 9 Drawing Sheets

POWER SUPPLY DEVICE

CROSS-REFERENCE TO RELATED APPLICATION

This application claims priority to Japanese Patent Application No. 2012-171663 filed Aug. 2, 2012 which is hereby expressly incorporated by reference herein in its entirety.

BACKGROUND

The present invention relates to a power supply device. Specifically, the power supply device performs PFM (pulse frequency modulation) control relative to a switching element by using a digital circuit.

A known power supply device is disclosed in Japanese Patent Publication Number 2006-295802. This power supply device has a pulse control device that has a clock generator, a pulse driving signal generation unit and a PFM (pulse frequency modulation) control unit. In this pulse control device, the clock generator generates a clock signal, which has any frequency, based on a pulse that is output from an oscillator (not shown) such as a crystal oscillator and supplies the clock signal to the pulse driving signal generation unit. The pulse driving signal generation unit generates a pulse driving signal based on the clock signal that is input and outputs the pulse driving signal to a switching element. Specifically, the pulse driving signal has a switching frequency that is set by the PFM control unit. The PFM control unit performs a PFM operation (calculation), which corresponds to a digital arithmetic process, by sampling a feedback signal that is induced at a secondary winding in a feedback transformer every control cycle. Then, the PFM control unit sets the calculated switching frequency in the pulse driving signal generation unit.

In this pulse control device, first of all, the PFM control unit performs sampling by A/D converting the feedback signal. Next, based on information of an output power after performing sampling, the PFM control unit performs the PFM operation for a pulse frequency (a switching frequency) of the pulse driving signal, which corresponds to a PFM pulse, determines a PFM pulse frequency and sets it in the pulse driving signal generation unit. The operations of the PFM control unit with respect to the determination and setting explained above are repeated. In this case, specifically, the pulse driving signal generation unit counts the clock signal that is input, and at the same time, generates the pulse driving signal by suitably raising or lowering an output signal level according to a count number. Further, as an example, the pulse driving signal generation unit performs a frequency modulation of the pulse driving signal by making a width of an ON period of the pulse driving signal constant and changing a width of an OFF period corresponding to the PFM pulse frequency that is set by the PFM control unit. Therefore, according to the above count number that is counted by the pulse driving signal generation unit, a frequency of the pulse driving signal is defined. Thus, even though Japanese Patent Publication Number 2006-295802 does not disclose it, the above count number that is counted by the pulse driving signal generation unit is considered to be set as a number that shows a determined PFM pulse frequency by the PFM control unit.

The power supply device described above, however, still has some problems to be solved as discussed below. That is, it is necessary in this power supply device that a frequency of the clock signal that is output from the clock generator to the pulse driving signal generation unit must be raised to make an adjustment unit finer in regards to a frequency of the pulse driving signal. However, when the frequency of the clock signal is raised, as a result, an electric part capable of high speed operations needs to be used as an electric part such as a CPU that configures the pulse driving signal generation unit. Therefore, the problems to be solved, such as an increase of noise and an increase of electric power consumption, exist.

The present invention attempts to solve these problems. An object of the present invention is to provide a power supply device that can avoid using high-speed electric parts, and at the same time, that can make an adjustment unit finer in regards to a frequency of a driving signal for a switching element.

SUMMARY

To achieve the above object, a power supply device according to one aspect of the present invention includes: two switching elements; a converter that supplies electric power by on and off operations of the two switching elements; a voltage detection unit that detects an output voltage of the converter; and a control unit that performs PFM control for the switching elements. The control unit includes: an A/D conversion circuit that converts the output voltage to a voltage digital value; a processing circuit that calculates a first control command value based on the voltage digital value, that calculates a new first control command value adjusting the output voltage to a target voltage, that calculates a difference value between the first control command value and the new first control command value, and that outputs a first charging and discharging voltage, which has a polarity corresponding to the difference value, for a first output period corresponding to the difference value at a first predetermined cycle; a first command value voltage generation circuit that has a first storage element, which is charged by the first charging and discharging voltage for the first output period when the first charging and discharging voltage is at a high level and which is discharged by the first charging and discharging voltage for the first output period when the first charging and discharging voltage is at a low level, a first charging voltage for the first storage element is varied in accordance with the new first control command value, the first command value voltage generation circuit outputs the first charging voltage as a first command value voltage; a signal generation circuit that generates a pulse signal in which a frequency increases or decreases in accordance with a voltage value of the first command value voltage; and a driving signal generation circuit that generates a pair of toggle signals, which toggle a signal level in a state in which each phase of the toggle signals are opposite in synchronization with the input of the pulse signal and that outputs the toggle signals as a pair of driving signals for the two switching elements.

In the power supply device according to the aspect of the present invention, a current detection unit detects a current of the converter. The control unit has a second command value voltage generation circuit. The A/D conversion circuit converts a current value of the current detected by the current detection unit to a current digital value. The processing circuit outputs a second charging and discharging voltage at a second predetermined cycle, the second charging and discharging voltage toggles from the low level to the high level for a second output period corresponding to the current digital value. The second command value voltage generation circuit has a second storage element, which is charged by the second charging and discharging voltage for the second output period when the second charging and discharging voltage is at the high level and which is discharged by the second charging and discharging voltage for the second output period when the second charging and discharging voltage is at the low level. A second charging voltage for the second storage element is varied in accordance with the current value. The second command value voltage generation circuit outputs the second charging voltage as a second command value voltage. The driving signal generation circuit shortens an output stop period between the pair of driving signals when the second command value voltage increases, the driving signal generation circuit elongates the output stop period when the second command value voltage decreases.

In the power supply device according to the aspect of the present invention, the control unit includes a limit circuit that controls an upper limit value of the first charging voltage.

A power supply device according to another aspect of the present invention further includes: a switching element; a converter that supplies electric power by on and off operations of the switching element; a voltage detection unit that detects an output voltage of the converter; and a control unit that performs PFM control for the switching element. The control unit comprises: an A/D conversion circuit that converts the output voltage to a voltage digital value; a processing circuit that calculates a control command value based on the voltage digital value, that calculates a new control command value adjusting the output voltage to a target voltage, that calculates a difference value between the control command value and the new control command value, and that outputs a charging and discharging voltage, which has a polarity corresponding to the difference value, for an output period corresponding to the difference value at a predetermined cycle; a command value voltage generation circuit that has a storage element, which is charged by the charging and discharging voltage for the output period when the charging and discharging voltage is at a high level and which is discharged by the charging and discharging voltage for the output period when the charging and discharging voltage is at a low level, a charging voltage for the storage element is varied in accordance with the new control command value, the command value voltage generation circuit outputs the charging voltage as a command value voltage; a signal generation circuit that generates a pulse signal in which a frequency increases or decreases in accordance with a voltage value of the command value voltage; and a driving signal generation circuit that generates a driving signal for driving the switching element, the driving signal has the same frequency as the pulse signal, a pulse width of the driving signal is constant.

In the power supply device according to the aspect of the present invention, the control unit calculates the new first control command value so as to control the output voltage to be the target voltage based on the voltage digital value that corresponds to a voltage value of the output voltage. Further, the control unit calculates a difference value between the new first control command value described above and the (previous) first control command value. Note that the previous first control command value is obtained before the new first control command value is obtained. In the present specification, it is referred to as either "the first control command value" or "the previous first control command value." Further, the control unit performs output of the first charging and discharging voltage according to this difference value described above. A first command value voltage generation circuit has a first storage element that is charged and discharged by this first charging and discharging voltage. The first command value voltage generation circuit outputs a charging voltage (an analog voltage) as the first command value voltage. The charging voltage is for the first storage element and is continuously changed (in a stepless manner) according to the first charging and discharging voltage. The signal generation circuit, which generates a pulse signal in which a frequency increases or decreases in accordance with a voltage value of the first command value voltage that is an analog voltage. Thus, the signal generation circuit performs as an analog system VCO (voltage controlled oscillator) so as to continuously change a frequency of a pulse signal in the stepless manner based on the first command value voltage. Then, the driving signal generation circuit generates a pair of driving signals for two switching elements of the converter based on this pulse signal.

Therefore, the power supply device according to the aspect of the present invention is able to change a frequency of the pair of driving signals for the switching element in a stepless manner (enable make an adjustment unit finer for a frequency of a pair of driving signals). At the same time, the power supply device of the present invention can decrease each operating frequency of the A/D conversion circuit and the processing circuit, which are configured as digital circuits, to be a minimum frequency. The above minimum frequency corresponds to a frequency in which a generation time of the first charging and discharging voltage, which is generated by the processing circuit, can be in time for an operating frequency of a control loop of the power supply device. As an example, when the operating frequency of the control loop is about 30 kHz, this power supply device can performs a calculation of the difference value explained above and an output of the first charging and discharging voltage at a 1/30 kHz cycle even when the operating frequency of the control loop is about 8 MHz in this power supply device described above. On the other hand, when the power supply device has a configuration in which a frequency of the pair of driving signals for the switching element is directly performed a PFM control by digital control within a range of several hundreds kHz, the digital circuit is needed to be operated by a frequency of 128 MHz when, for instance, if a number of adjustment steps for a frequency of 500 kHz is 256. However, the power supply device as explained above can operate the digital circuit by an adequately low-speed frequency (such as 8 MHz) than the frequency of 128 MHz. As a result, the use of high-speed electric parts can be avoided.

Further, the power supply device according to the aspect of the present invention has the current detection unit that detects a current that flows in the converter. At the same time, when a current value of a current that flows in the converter increases, the control unit shortens an length of an output stop period (a dead time) between a pair of driving signals according to this increased current value. In contrast, when a current value of the current decreases, the control unit can extend the length of the output stop period according to this decreased current value. As a result, efficiency of the converter can be improved.

According to the power supply devices according to the aspect of the present invention, because the control unit has the limit circuit that limits an upper limit of the first command value voltage, a lower limit of the frequency of the pair of driving signals can certainly be maintained within a frequency of the PFM control for the converter.

Further, in the power supply device according to the aspect of the present invention, the control unit calculates a new first control command value and calculates a difference value between the new first control command value described above and a previous first control command value. Further, the control unit outputs the first charging and discharging voltage according to this difference value. Further, the first command value voltage generation circuit outputs the charging voltage (an analog voltage) as the first command value voltage. The charging voltage is for the first storage element and is changed in a stepless manner according to the first charging and discharging voltage. Thus, the signal generation circuit performs as an analog system VCO (voltage controlled oscillator) so as to continuously change a frequency of a pulse signal in the stepless manner based on the first command value voltage. Then, the driving signal generation circuit generates a driving signal, which has the same frequency as the pulse signal and has a constant pulse width, for the switching element.

Therefore, the power supply device explained above is able to change the frequency of the driving signal for the switching element in a stepless manner (enable make an adjustment unit finer for the frequency of the driving signal). At the same time, the power supply device can decrease each operating frequency of the A/D conversion circuit and the processing circuit, which are configured as digital circuits, to a minimum frequency. Specifically, the above minimum frequency corresponds to a frequency in which the generation time of the charging and the discharging voltage, which is generated by the processing circuit, can be in time for the operating frequency of a control loop of the power supply device. Therefore, the power supply device can operate the digital circuit by a low-speed frequency. As a result, the use of high-speed electric parts can be avoided.

DESCRIPTION OF EXEMPLARY EMBODIMENTS

A power supply device 1 according to an embodiment of the present invention is explained below with reference to the drawings.

Figure 1:
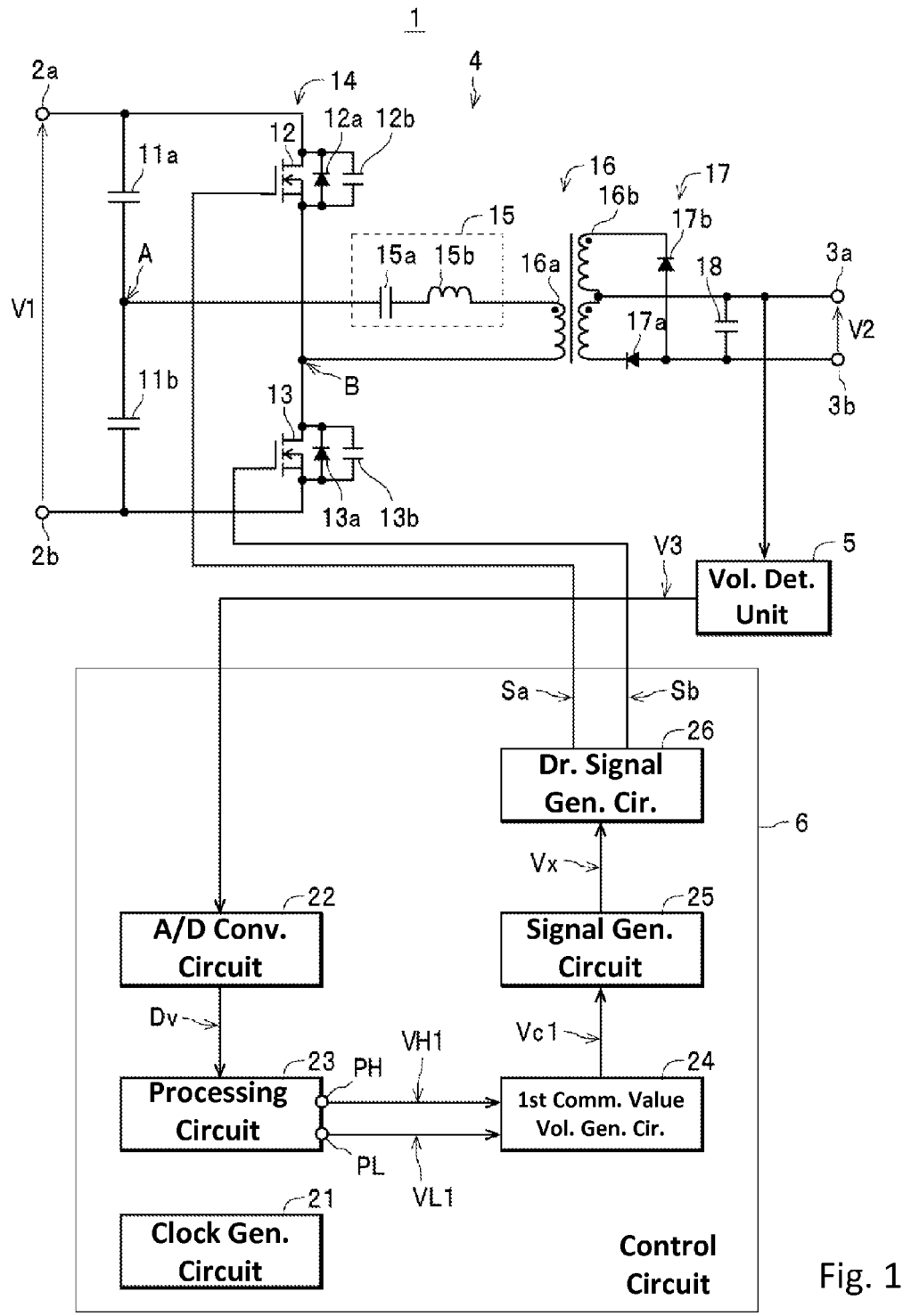
FIG. 1 is a circuit diagram of a power supply device according to an embodiment of the present invention.

First, a configuration of the power supply device 1 will be explained below with reference to the drawings. As an example, the power supply device 1 shown in FIG. 1 is configured with a pair of input terminals 2a and 2b (also referred to as an "input terminal 2" below when not distinguished), a pair of output terminals 3a and 3b (also referred to as an "output terminal 3" below when not distinguished), a converter 4, a voltage detection unit 5 and a control unit 6. Further, the power supply device 1 converts an input voltage (DC voltage) V1 that is input to the input terminal 2 into an output voltage (DC voltage) V2 and outputs the output voltage V2 from the output terminal 3, and at the same time, controls the output voltage V2 to be a target voltage that is defined in advance.

The converter 4 is configured with a pair of input capacitors 11a and 11b, a switching circuit 14 that is configured with two sets of switching elements, a resonance circuit 15, a transformer 16, a rectifier circuit 17 and an output capacitor 18. Further, as an example, a circuit system of the switching circuit 14 is configured as a half bridge type. In the converter 4, an input voltage V1, which is input from the input terminal 2, is converted to an output voltage V2 so that the output voltage V2 is output to the output terminal 3.

The pair of input capacitors 11a and 11b are connected in series with each other. At the same time, the input capacitor 11a is connected to the input terminal 2a. Further, the input capacitor 11b is connected to the input terminal 2b. In the state explained above, the pair of input capacitors 11a and 11b are connected between the pair of input terminals 2a and 2b.

One of two switching elements that configure the switching circuit 14 is, as an example, configured with one switching element 12. The other of the switching elements is, as an example, configured with one switching element 13. Further, the switching elements 12 and 13 are connected between the pair of input terminals 2a and 2b in a state in which the switching elements 12 and 13 are connected in series with each other. In the embodiment of the present invention, as an example, the switching elements 12 and 13 are configured with an N channel MOSFET (metal oxide semiconductor field effect transistor). Specifically, the N channel MOSFETs correspond to field effect transistors that has parasitic diodes 12a, 13a and stray capacitances 12b, 13b. A drain terminal of the switching element 12 is connected to the input terminal 2a. A source terminal of the switching element 12 is connected to a drain terminal of the switching element 13. At the same time, a source terminal of the switching element 13 is connected to the input terminal 2b. Further, when driving signals Sa and Sb that are output from the control circuit 6 are respectively input to gate terminals of the switching element 12 and 13, the switching elements 12 and 13 are alternatively driven in ON and OFF states (performing ON and OFF operations).

Further, though it is not shown, a circuit system of the switching circuit 14 can also be a push-pull type that has two sets of the switching elements in the same manner as the configuration of the half bridge type as explained above. Specifically, the two sets of switching elements alternatively perform ON and OFF operations by the driving signals Sa and Sb. Each set of switching elements is respectively configured with one switching element. Further, the full bridge type can also be adopted as a circuit system of the switching circuit 14. In this full bridge type, though it is not shown, switching elements of each set are respectively configured with two switching elements. One switching element of one set and one switching element of the other set are connected in series in this order, and at the same time, the other switching element of the other set and the other switching element of the one set are connected in series in this order. Further, these two series circuits are connected in parallel with each other. In this configuration, for instance, the two switching elements of the one set are turned ON and OFF by the driving signal Sa and the two switching elements of the other set are turned ON and OFF by the driving signal Sb.

As an example, the resonance circuit 15 is configured with a resonance capacitor 15a and a resonance inductor 15b that are connected in series. Further, one end of the resonance circuit 15 is connected to a node A connected between the pair of input capacitors 11a and 11b. At the same time, another end of the resonance circuit 15 is connected to one end of a primary winding 16a of a transformer 16 that will be explained below. Further, each value of the resonance capacitor 15a and the resonance inductor 15b of the resonance circuit 15 is defined in advance so as to operate the switching elements 12 and 13 by a zero voltage switching operation by making a resonant frequency at the primary side of the transformer 16 through the resonance circuit 15 is somewhat lower than a switching frequency (a frequency of the driving signals Sa and Sb) of the set of first switching elements 12 and 13.

The resonance inductor 15b can be configured with a leakage inductance of the transformer 16. Further, each of the input capacitors 11a and 11b of the present embodiment also configures the resonance circuit 15 in the same way as the resonance capacitor 15a. Therefore, a configuration in which each of the input capacitors 11a and 11b is only used for the resonance circuit 15 (that is, a configuration in which the resonance capacitor 15a is omitted) instead of a configuration in which each of the input capacitors 11a and 11b are used along with the resonance capacitor 15a.

As shown in FIG. 1, the transformer 16 has a primary winding 16a and a secondary winding 16b. Further, a mark "●" shown in FIG. 1 corresponds to a polarity of the primary winding 16a and the secondary winding 16b. In this case, one end of the primary winding 16a is connected to the resonance circuit 15 as explained above. Another end of the primary winding 16a is connected to a node B that connects between the pair of switching elements 12 and 13. Further, in the transformer 16, an AC (alternating current) voltage is induced from the primary winding 16a to the secondary winding 16b according to switching of the switching elements 12 and 13 (according to alternatively performing ON and OFF operations of the switching elements 12 and 13). Further, as an example, a center tap is provided at the secondary winding 16b of the present embodiment.

As an example, the rectifier circuit 17 is configured with two rectifying elements 17a and 17b (as an example, they are diodes in this embodiment). In this case, a cathode terminal of the rectifying element 17a is connected to one end of the secondary winding 16b. A cathode terminal of the rectifying element 17b is connected to other end of the secondary winding 16b. At the same time, anode terminals of the rectifying elements 17a and 17b are connected to each other. Further, each of the rectifying elements 17a and 17b can be configured with a Metal Oxide Semiconductor (MOS) Field Effect Transistor (FET), which performs synchronous rectification control, instead of a diode. Further, when the center tap is not provided at the secondary winding 16b, a configuration of a full bridge type, in which four rectifying elements are used, can also be adopted for the rectifying circuit 17.

According to the configuration as explained above, the rectifying circuit 17 performs the full-wave rectification of an AC voltage that is induced in the secondary winding 16b. Further, the rectifying circuit 17 outputs a pulsating flow voltage, which is generated by the full-wave rectification, between the center tap of the secondary winding 16b and the anode terminals of the rectifying elements 17a and 17b under the following condition. Specifically, the condition is when an electrical potential of the anode terminals of the rectifying elements 17a and 17b is a reference, a side of the center tap of the secondary winding 16b is a positive potential. The output capacitor 18 is connected between the center tap of the secondary winding 16b and the anode terminals of the rectifying elements 17a and 17b, and smooths the above pulsating flow voltage that is output from the rectifying circuit 17, and converts it into the output voltage value V2. Further, the output capacitor 18 outputs the output voltage V2, which is converted from the pulsating flow voltage, between the pair of output terminals 3a and 3b.

According to the configuration as explained above, the converter 4 functions as a current resonance type DC-DC converter. Specifically, because the two sets of switching elements 12 and 13 alternatively perform ON and OFF operations, an electric power is provided to a load (not shown) that is connected to the output terminal 3. Further, within a frequency that is higher than a resonant frequency, each of the switching elements 12 and 13 in the converter 4 performs the PFM control by the control unit 6.

The voltage detection unit 5 detects the output voltage V2 and outputs it to the control unit 6. As an example, the voltage detection unit 5 is configured with a plurality of resistors (not shown) and detects the output voltage V2. At the same time, the voltage detection unit 5 divides (by a ratio that is already known) the output voltage V2 into a voltage V3 that is capable to be processed by the control unit 6 and outputs the voltage V3 to the control unit 6.

The control unit 6 converts a voltage value of the output voltage V2 that is detected by the voltage detection unit 5 (which corresponds to a voltage value of the voltage V3 in this embodiment) into a digital value. Further, the control unit 6 calculates a first control command value, which defines the operating frequencies of the switching elements 12 and 13, based on this digital value by a digital arithmetic. Thus, the control unit 6 outputs the driving signals Sa and Sb to the switching elements 12 and 13 so as to perform the PFM control for the switching elements 12 and 13.

Specifically, the control unit 6 is configured with a clock generation circuit 21, an A/D (analog to digital) conversion circuit 22, a processing circuit 23, a first command value voltage generation circuit 24, a signal generation circuit 25 and a driving signal generation circuit 26.

In this case, as an example, the clock generation circuit 21 generates a reference clock signal of 8 MHz (not shown) and outputs the reference clock signal to the processing circuit 23. Further, the clock generation circuit 21 divides the reference clock signal (it is divided into a 1/256 frequency in this embodiment) so as to generate a clock signal of 31.25 kHz (not shown) and outputs the generated clock signal of 31.25 kHz to the A/D conversion circuit 22 and the processing circuit 23. The A/D conversion circuit 22 samples the voltage V3, which is output from the voltage detection unit 5, by the clock signal as described above. As a result, a voltage value of the voltage V3 is converted into a digital value Dv and is outputs by the A/D conversion circuit 22.

The processing circuit 23 is configured with a digital circuit that has a CPU and a memory (not shown either) and performs a difference value calculation process and a first voltage output process. In the difference value calculation process, the processing circuit 23 performs a calculation process, which will be explained below, every single cycle T1 (=1/31.25 kHz) of the clock signal described above based on the digital value Dv that is output from the A/D conversion circuit 22. Specifically, the processing circuit 23 calculates a new first control command value so as to control the output voltage V2 to be a target voltage and calculates a difference value between the new first control command value described above and the previous first control command value. That is, the frequency of the clock signal (31.25 kHz) corresponds to an operating frequency of a control loop in the power supply device 1.

Specifically, in the difference value calculation process explained above, first of all, the processing circuit 23 obtains the digital value Dv that is output from A/D conversion circuit 22 in synchronization with the clock signal. At the same time, the processing circuit 23 calculates the voltage value of the output voltage V2 based on the voltage value of the voltage V3 that is shown by this digital value Dv. Next, the processing circuit 23 compares the voltage value of the output voltage V2 that is calculated and a voltage value of the target voltage. The processing circuit 23 freshly calculates a first control command value (a new first control command value) and stores it in the memory. Specifically, for instance, when the voltage value of the output voltage V2 is less than the voltage value of the target voltage, the first control command value increases as compared to one previous time. When the voltage value of the output voltage V2 is more than the voltage value of the target voltage, the first control command value decreases as compared to one previous time. Further, when the voltage value of the output voltage V2 is the same as the voltage value of the target voltage, the first control command value becomes the same as one previous time. Next, the processing circuit 23 calculates a difference value between this new first control command value and the previous first control command value that is read from the memory (=the new first control command value—the previous first control command value) and stores the calculated difference value in the memory.

Figure 5:
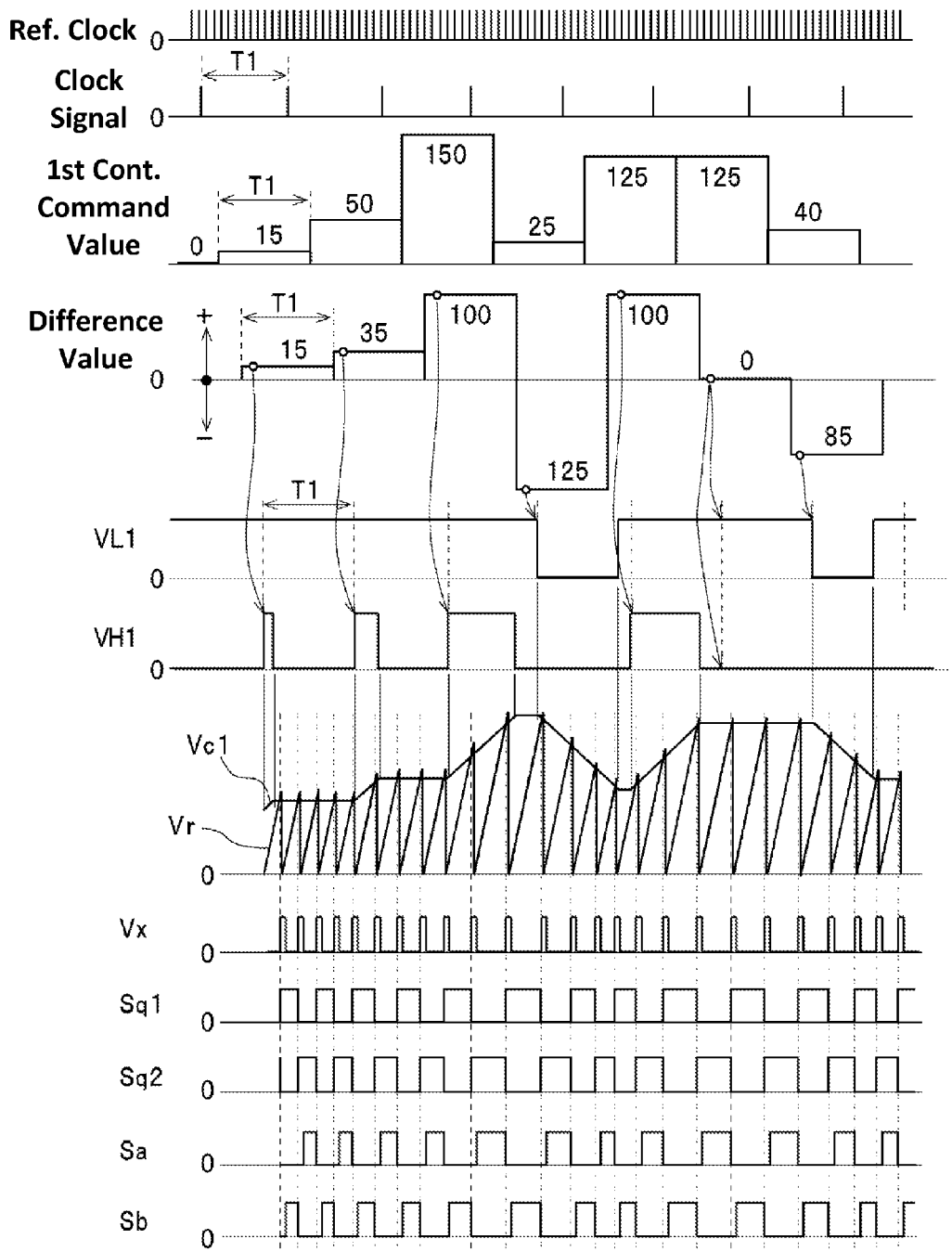
FIG. 5 is a waveform diagram to explain an operation of a power supply device according to an embodiment of the present invention.

As an example, as shown in FIG. 5, when the processing circuit 23 calculates the first control command values such as "0," "15," "50," "150," "25," "125," "125" and "40" every cycle T1, the processing circuit 23 calculates the difference values such as "15," "35," "100," "−125," "100," "0" and "−85" as shown in FIG. 5 and stores the calculated difference values in the memory.

Further, in the first voltage output process, the processing circuit 23 outputs a first charging and discharging voltage, which will be explained in detail below, every single cycle T1 of the clock signal for only an output period that corresponds to a length according to a size of the difference value that will be explained below (an absolute value of the difference value). The first charging and discharging voltage has a level that corresponds to a polarity of the difference value as described above out of a high level and a low level. Specifically, the high level corresponds to a level of voltage levels that shows two logic levels and that are used in a digital circuit. For instance, the high level is between 3.5 V and 5 V in a TTL (transistor-transistor logic). On the other hand, the low level corresponds to a level out of the voltage levels that shows two logic levels and that are used in a digital circuit. For instance, the low level is between 0 V and 0.8 V in the TTL. Specifically, in the first voltage output process, first of all, the processing circuit 23 reads out a difference value from the memory every single cycle T1 of the clock signal.

Next, when a polarity of the difference value is positive, as shown in FIG. 5, the processing circuit 23 outputs a high level charging voltage VH1 as the first charging and discharging voltage from a charging terminal PH (refer to FIG. 1) for only an output period (a period less than the cycle T1) according to a size of the difference value (an absolute value of the difference value). Specifically, the charging terminal PH outputs a low level voltage in a normal condition. Further, when a polarity of the difference value is negative, as shown in FIG. 5, the processing circuit 23 outputs a low level discharging voltage VL1 as the first charging and discharging voltage from a discharging terminal PH (refer to FIG. 1) for only an output period (a period less than the cycle T1) according to a size of the difference value (an absolute value of the difference value). Specifically, the discharging terminal PL outputs a high level voltage in a normal condition. Further, when the difference value is zero, the processing circuit 23 stops the output of the charging voltage VH1 and the discharging voltage VL1 as shown FIG. 5. Thus, the processing circuit 23 outputs either one of the corresponding charging voltage VH1 and the corresponding discharging voltage VL1 from either one of the charging terminal PH and the discharging terminal PL according to the polarity of the difference value for only the output period is less than the single cycle T1. Therefore, a condition in which the charging voltage VH1 and the discharging voltage VL1 are output at the same time does not happen. Further, the charging terminal PH and the discharging terminal PL are configured with an I/O port of a CPU that configures the processing circuit 23.

Figure 2:
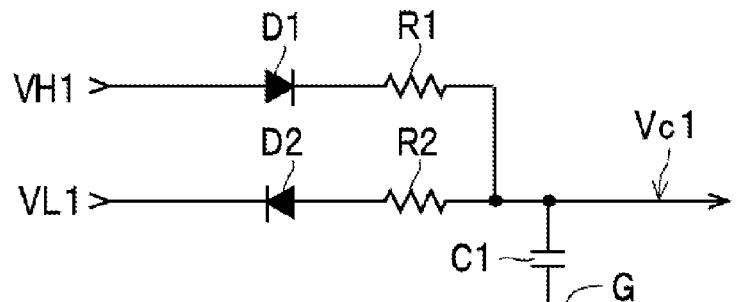
FIG. 2 is a circuit diagram of a first command value voltage generation circuit according to an embodiment of the present invention.

As an example shown in FIG. 2, the first command value generation circuit 24 is configured with a capacitor C1, a pair of rectifying elements D1 and D2 (a diode in this embodiment and also referred to as "Diodes D1 and D2") and a pair of resistors R1 and R2. The diode D1 is connected to the resistor R1 in series because a cathode terminal of the diode D1 is connected to one terminal of the resistor R1. The diode D2 is connected to the resistor R2 in series because an anode terminal of the diode D2 is connected to one terminal of the resistor R2. Further, the other terminals of the resistors R1 and R2 are connected to one terminal of the capacitor C1. The other terminal of the capacitor C1 is connected to a reference potential (as an example, a grand potential) G.

In this configuration of the first command value voltage generation circuit 24, the capacitor C1 works as a first storage element. When a charging voltage VH1 as a first charging and discharging voltage, which is input to the anode terminal of the diode D1, is at a high level, the capacitor C1 is charged by the charging voltage VH1 only for a corresponding output period. On the other hand, when a discharging voltage VL1 as the first charging and discharging voltage, which is input to the cathode terminal of the diode D2, is at a low level, the capacitor C1 is discharged by this discharging voltage VL1 only for a corresponding output period. Further, when the charging voltage VH1 is at the low level, and at the same time, when the discharging voltage VL1 is at the high level, charging and discharging for the capacitor C1 is stopped. That is, a voltage value of a charging voltage Vc1, which will be explained below, is on hold. Thus, the charging voltage Vc1 of the capacitor C1, which is charged and discharged as explained above, corresponds to an analog signal that changes in a stepless manner according to a new first control command value. The first command value voltage generation circuit 24 outputs the charging voltage Vc1 as the first command value voltage (also referred to as a "first command value voltage Vc1" below).

Figure 3:
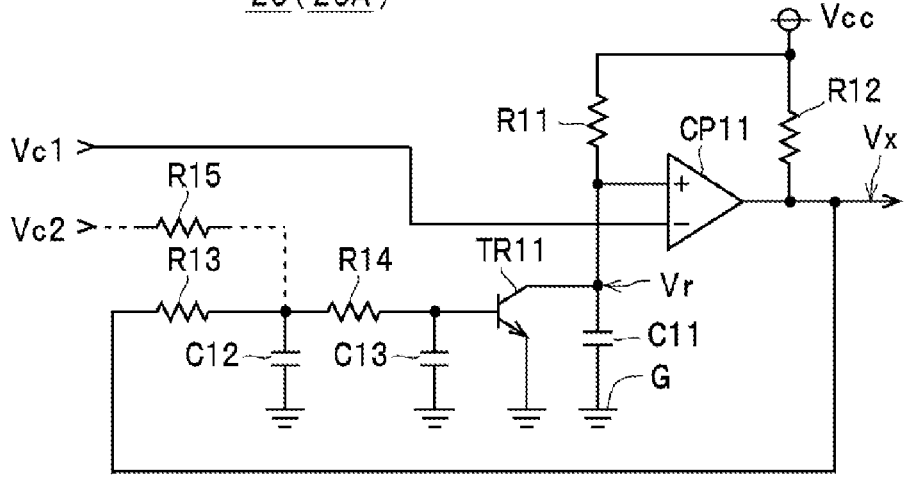
FIG. 3 is a circuit diagram of a signal generation circuit according to an embodiment of the present invention.

The signal generation circuit 25 generates a pulse signal Vx in which a frequency decreases or increases according to a voltage value of the first command value voltage Vc1 and outputs the pulse signal Vx. Specifically, as an example, the signal generation circuit 25 shown in FIG. 3 is configured with a comparator CP11, a resistor R11, a capacitor C11, a resistor R12, a switching element TR11, a RC series circuit that is configured with a resistor R13 and a capacitor C12, and a RC series circuit that is configured with a resistor R14 and a capacitor C13. Specifically, the first command value voltage Vc1 is input to an inverting input terminal of the comparator CP11. The resistor R11 is connected between a power supply Vcc and a non-inverting input terminal of the comparator CP11. The capacitor C11 is connected between a reference potential G and the non-inverting input terminal of the capacitor CP11. The resistor R12 is connected between the power supply Vcc and an output terminal of the comparator CP11. The switching element TR11 is connected to the capacitor C11 in parallel (as an example in this embodiment, the switching element TR11 is an npn type bipolar transistor). In this case, these two RC series circuits are connected in series and delay the pulse signal Vx, which is output from the comparator CP11, for a predetermined period of time. Further, the pulse signal Vx is output as a driving signal for the switching element TR11.

In the signal generation circuit 25 described above, in a state in which the first command value voltage Vc1 is input to the non-inverting input terminal of the comparator CP11, when a discharging operation of the switching element TR11 for the capacitor C11 is finished by shifting from an ON state to an OFF state in the switching element TR11, the capacitor C11 is charged through the resistor R11. As a result, a charging voltage Vr of the capacitor C11 starts to increase from a zero voltage toward a voltage of the power supply Vcc. In this case, a capacitance value of the capacitor C11 and a resistance value of the resistor R11 are defined in advance so that a period of time, which is from a zero voltage until the charging voltage Vr reaches a voltage of the non-inverting input terminal (the first command value voltage Vc1< a voltage of the power supply Vcc), is about several µs. Further, when the capacitance value of the capacitor C11 and the resistance value of the resistor R11 are defined as discussed above so that the charging voltage Vr reaches the voltage of the non-inverting input terminal in a short period of time, the charging voltage Vr increases at a substantially constant rate. Further, the comparator CP11 maintains the voltage level that is output from the output terminal to be at a low level (substantially the same voltage as the reference potential G) until the charging voltage Vr of the capacitor C11 reaches the voltage of the non-inverting input terminal (the first command value voltage Vc1). That is, the output of the pulse signal Vx is stopped.

When the charging voltage Vr of the capacitor C11 reaches the voltage of the non-inverting input terminal (the first command value voltage Vc1) and exceeds the voltage of the non-inverting input terminal (the first command value voltage Vc1), the comparator CP11 starts to output substantially the same voltage as the power supply Vcc (a high level voltage) from the output terminal. That is, the comparator CP11 starts to output the pulse signal Vx. The voltage that is output from the output terminal of the comparator CP11 is delayed for a predetermined period of time through the two RC series circuits as described above and is supplied to the switching element TR11 as a driving signal. As a result, the switching element TR11 shifts from an OFF state to an ON state and starts a discharging operation of the capacitor C11. Therefore, the charging voltage Vr decreases from a voltage that is more than the first command value voltage Vc1 to the reference potential G for a very short period of time. As a result, because the charging voltage Vr is lower than the first command value voltage Vc1, the comparator CP11 shifts the voltage level that is output from the output terminal from the high level to the low level. That is, the comparator CP11 stops the output of the pulse signal Vx. As a result, because the switching element TR11 shifts from an ON state to an OFF state, the charging of the capacitor C11 described above restarts. As shown in FIG. 5, because a waveform of the charging voltage Vr becomes a ramp waveform, this is also referred to as a "ramp voltage Vc1" below.

Because the operations explained above are repeated, the signal generation circuit 25 periodically outputs the pulse signal Vx in which a pulse width is defined by a delay time of the two RC series circuits. In this case, when the voltage value of the first command value voltage Vc1 is lower, the charging voltage Vr reaches the first command value voltage Vc1 in a shorter time (several µs). Therefore, when the voltage value of the first command value voltage Vc1 is low, the frequency of the pulse signal Vx (several hundreds kHz) becomes high. When the voltage value of the first command value voltage Vc1 is high, the frequency of the pulse signal Vx becomes low. As an example of the operation in which the signal generation circuit 25 generates and outputs the pulse signal Vx in which a frequency decreases or increases according to the voltage value of the first command value voltage Vc1, the signal generation circuit 25 performs an operation as follows. In this embodiment, when the voltage value of the first command value voltage Vc1 increases, the signal generation circuit 25 decreases the frequency of the pulse signal Vx that is output. Further, when the voltage value of the first command value voltage Vc1 decreases, the signal generation circuit 25 increases the frequency of the pulse signal Vx that is output. As a result, the signal generation circuit 25 works as an analog system VCO (voltage controlled oscillator).

Figure 4:
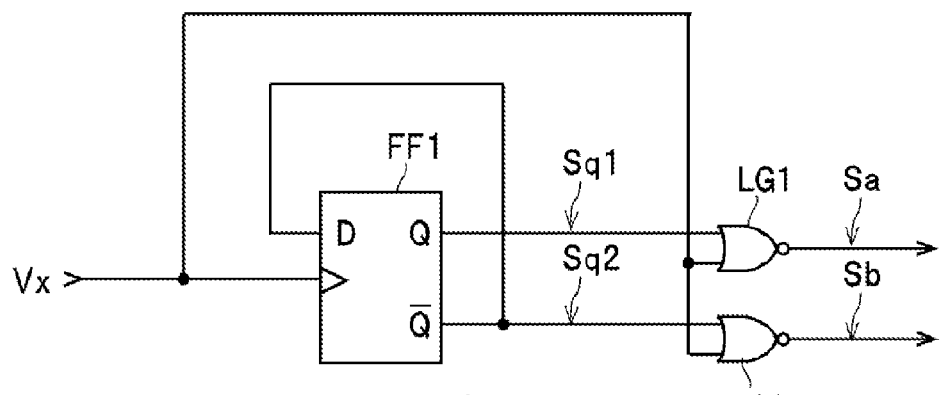
FIG. 4 is a circuit diagram of a driving signal generation circuit according to an embodiment of the present invention.

As an example shown in FIG. 4, the driving signal generation circuit 26 is configured with a flip-flop FF1 and two NOR type logic gates LG1 and LG2. Specifically, as an example of this embodiment, the flip-flop corresponds to a D type flip-flop, however, a JK type flip-flop or a RS type flip-flop can also be used. In this case, an inverting Q output terminal and a D input terminal are connected with each other in the flip-flop FF1. As a result, every time the pulse signal Vx as a clock signal is input to the clock terminal, the flip-flop FF1 toggles a signal level of a Q signal Sq1 and a signal level of an inverting Q signal Sq2 in a state in which their phases are inverted. Specifically, the Q signal Sq1 is output from a Q output terminal. The inverting Q signal Sq2 is output from the inverting Q output terminal. As a result, as shown in FIG. 5, the flip-flop FF1 outputs the Q signal Sq1 and the inverting Q signal Sq2 as a pair of toggle signals in which a duty ratio is 0.5.

The Q signal Sq1 and the pulse signal Vx are input to the logic gate LG1. Thereafter, the logic gate LG1 outputs a pulse signal as a driving signal Sa in which a signal level is inverted compared with a signal level of the Q signal Sq1 and in which a pulse width is narrower than a pulse width of the Q signal Sq1 by a pulse width of the pulse signal Vx (pulse widths: Sa=Sq1−Vx). On the other hand, the inverting Q signal Sq2 and the pulse signal Vx are input to the logic gate LG2. Thereafter, the logic gate LG2 outputs a pulse signal as a driving signal Sb in which a signal level is inverted compared with a signal level of the inverting Q signal Sq2 and in which a pulse width is narrower than a pulse width of the inverting Q signal Sq2 by a pulse width of the pulse signal Vx (pulse widths: Sb=Sq2−Vx). As a result, the driving signal generation circuit 26 generates a pair of driving signals Sa and Sb in a state in which a dead time (an output stop period) of a pulse width of the pulse signal Vx is provided in both driving signals Sa and Sb. In addition, a signal level of the driving signals Sa and Sb is toggled in synchronization with the pulse signal Vx. Further, a frequency of the pair of driving signals Sa and Sb is a half of a frequency of the pulse signal Vx.

In FIG. 5, a ratio of the pulse width of the pulse signal Vx relative to each pulse width of the Q signal Sq1 and the inverting Q signal Sq2 is large in order to make a comprehension of the present invention easy. In reality, however, the ratio of the pulse width of the pulse signal Vx relative to each pulse width of the Q signal Sq1 and the inverting Q signal Sq2 is smaller. That is, the dead time is adequately short. Therefore, the driving signal generation circuit 26 generates the pair of driving signals Sa and Sb as the pulse signal in which the duty ratio is substantially constant and outputs the generated pulse signal to switching elements 12 and 13 corresponding to the driving signals Sa and Sb. Specifically, a frequency of the driving signals Sa and Sb is controlled within several hundreds kHz. The duty ratio explained above is somewhat less than 0.5 (for instance, about 0.48) and is substantially constant.

Next, an operation of the power supply device 1 according to an embodiment of the present invention is explained with reference to the drawing below.

In the power supply device 1 of the embodiment, the A/D conversion circuit 22 in the control circuit 6 converts a voltage value of the output voltage V2, which is detected by the voltage detection unit 5, into a digital value Dv. Specifically, the voltage value of the output voltage V2 corresponds to a voltage value of the voltage V3. Next, the processing circuit 23 in the control circuit 6 performs calculations that are explained above based on this digital value Dv every cycle T1 of the clock signal described above. Specifically, the processing circuit 23 calculates a new first control command value so as to control the output voltage V2 to be the target voltage. Further, the processing circuit 23 calculates a difference value between the calculated new first control command value and the previous first control command value.

In this case, when the voltage value of the output voltage V2 that is shown by the digital value Dv is less than a voltage value of the target voltage, the processing circuit 23 increases the first control command value as compared with a previous value. When the voltage value of the output voltage V2 is more than the voltage value of the target voltage, the processing circuit 23 decreases the first control command value as compared with the previous value. When the voltage value of the output voltage V2 is the same as the voltage value of the target voltage, the processing circuit 23 maintains the first control command value to be the same as the previous value. Further, the processing circuit 23 performs according to a polarity of the difference value that is calculated as shown in FIG. 5. Specifically, when a polarity of the difference value is positive, the processing circuit 23 outputs a high level charging voltage VH1 from the charging terminal PH for only an output period corresponding to a size of the difference value. Further, when a polarity of the difference value is negative, the processing circuit 23 outputs a low level discharging voltage VL1 from the discharging terminal PL for only an output period corresponding to a size of the difference value.

Next, the first command value voltage generation circuit 24 in the control unit 6 charges the capacitor C1 by the charging voltage VH1 described above during the output period of the charging voltage VH1. The first command value voltage generation circuit 24 in the control unit 6 discharges the capacitor C1 by the discharging voltage VL1 described above during the output period of the discharging voltage VL1. As a result, the first command value voltage generation circuit 24 outputs the charging voltage Vc1 of the capacitor C1 as the first command value voltage Vc1. In this case, as shown in FIG. 5, the first command value voltage Vc1 is output as an analog signal that changes in the stepless manner according to the first control command value that is calculated in the processing circuit 23. Specifically, when the first control command value increases, the first command value voltage Vc1 increases in the stepless manner. Further, when the first control command value decreases, the first command value voltage Vc1 decreases in the stepless manner.

Next, the signal generation circuit 25 in the control unit 6 works as a VCO, in which the first command value voltage Vc1 corresponds to a control voltage, and outputs the pulse signal Vx. At the same time, as shown in FIG. 5, when the voltage value of the first command value voltage Vc1 increases, the signal generation circuit 25 decreases a frequency of the pulse signal Vx that is output. When the voltage value of the first command value voltage Vc1 decreases, the signal generation circuit 25 increases the frequency of the pulse signal Vx that is output. Further, the voltage value of the first command value voltage Vc1 is the same, the signal generation circuit 25 maintains the frequency of the pulse signal Vx that is output. In this case, the signal generation circuit 25 changes the frequency of the pulse signal Vx in the stepless manner based on the first command value voltage Vc1 that changes in the stepless manner as described above.

Next, as shown in FIG. 5, the driving signal generation circuit 26 in the control unit 6 generates the pair of driving signals Sa and Sb in a state in which a dead time of only a pulse width of the pulse signal Vx is provided in both driving signals Sa and Sb. Specifically, a signal level of the pulse signal Vx is toggled in synchronization with the pulse signal Vx. Further, the frequency of the pair of driving signal Sa and Sb is a half of the frequency of the pulse signal Vx. Then, the driving signal generation circuit 26 outputs the pair of generated driving signals Sa and Sb to the corresponding switching elements 12 and 13 of the switching circuit 14.

The control unit 6 performs the PFM control for the switching elements 12 and 13 of the converter 4. As explained above, when the voltage value of the output voltage V2 is more than the voltage value of the target voltage, the control unit 6 decreases a first control command value as compared to the previous value and decreases the first command value voltage Vc1 in the stepless manner. As a result, the control unit 6 decreases the output voltage V2 by increasing the frequency of the driving signals Sa and Sb in the stepless manner. On the other hand, when the voltage value of the output voltage V2 is less than the voltage value of the target voltage, the control unit 6 increases a first command value as compared to the previous value and increases the first command value voltage Vc1 in the stepless manner. As a result, the control unit 6 increases the output voltage V2 by decreasing the frequency of the driving signals Sa and Sb in the stepless manner. Further, when the voltage value of the output voltage V2 is the same as the voltage value of the target voltage, the control unit 6 maintains a first control command value to be the same value as the previous value and maintains the voltage value of the first command value voltage Vc1 to be the same value. As a result, the control unit 6 maintains the output voltage V2 to be the same voltage as the previous voltage by maintaining the frequency of the driving signals Sa and Sb to be the same frequency as the previous frequency. Thus, the output voltage V2 of the converter 4 is controlled to the target voltage.

As explained above, in the power supply device 1 according to the embodiment of the present invention, the processing circuit 23 calculates a new first control command value that controls the output voltage V2 to be the target voltage based on the digital value Dv that corresponds to the voltage value of the output voltage V2. The processing circuit 23 further calculates the difference value between the calculated new first control command value and the previous first control command value. Further, the processing circuit 23 performs the output of the charging voltage VH1 from the charging terminal PH or the output of the discharging voltage VL1 from the discharging terminal PL based on the calculated difference value. Thereafter, the first command value voltage generation circuit 24 generates the first command value voltage Vc1 that changes in the stepless manner based on the charging voltage VH1 and the discharging voltage VL1 and outputs the first command value voltage Vc1. The signal generation circuit 25, which is configured as the analog system VCO, changes the frequency of the pulse signal Vx based on the first command value voltage Vc1. Further, the driving signal generation circuit 26 generates the pair of driving signals Sa and Sb to the switching elements 12 and 13 of the converter 4 based on the pulse signal Vx.

Therefore, the power supply device 1 according to the embodiment of the present invention can change the frequency of the pair of driving signals Sa and Sb for the switching elements 12 and 13 in the stepless manner. That is, the power supply device 1 makes an adjustment unit finer for the frequency of the driving signals Sa and Sb. At the same time, the power supply device 1 can decrease each operating frequency of the clock generation circuit 21, the A/D conversion circuit 22 and the processing circuit 23, which are configured as digital circuits, to be a minimum frequency. The above minimum frequency (8 MHz in the embodiment) corresponds to a frequency in which a generation time of the charging voltage VH1 and the discharging voltage VL1, which are generated by the processing circuit 23, can be in time for the operating frequency (31.25 kHz) of a control loop of the power supply device 1. On the other hand, when the power supply device 1 has a configuration in which a frequency of the pair of driving signals Sa and Sb for the switching elements 12 and 13 is directly controlled by digital control within a range of several hundreds kHz, the digital circuit is needed to be operated by a frequency of 128 MHz when, for instance, if a number of adjustment steps for a frequency of 500 kHz is 256. However, the power supply device 1 explained above can operate the digital circuit by an adequately low-speed frequency (such as 8 MHz) than the frequency of 128 MHz. As a result, the use of high-speed electric parts can be avoided.

In the power supply device 1 that is described above, the dead time of the pair of driving signals Sa and Sb is constant. However, when the current value of the current I1 that flows in the primary side of the transformer 16 of the converter 4 increases during a period of the dead time, the dead time is shortened according to the increased current value. In contrast, when the current value of the current I1 decreases, the dead time is extended according to the decreased current value. As a result, the efficiency of the converter 4 can be improved.

Figure 6:
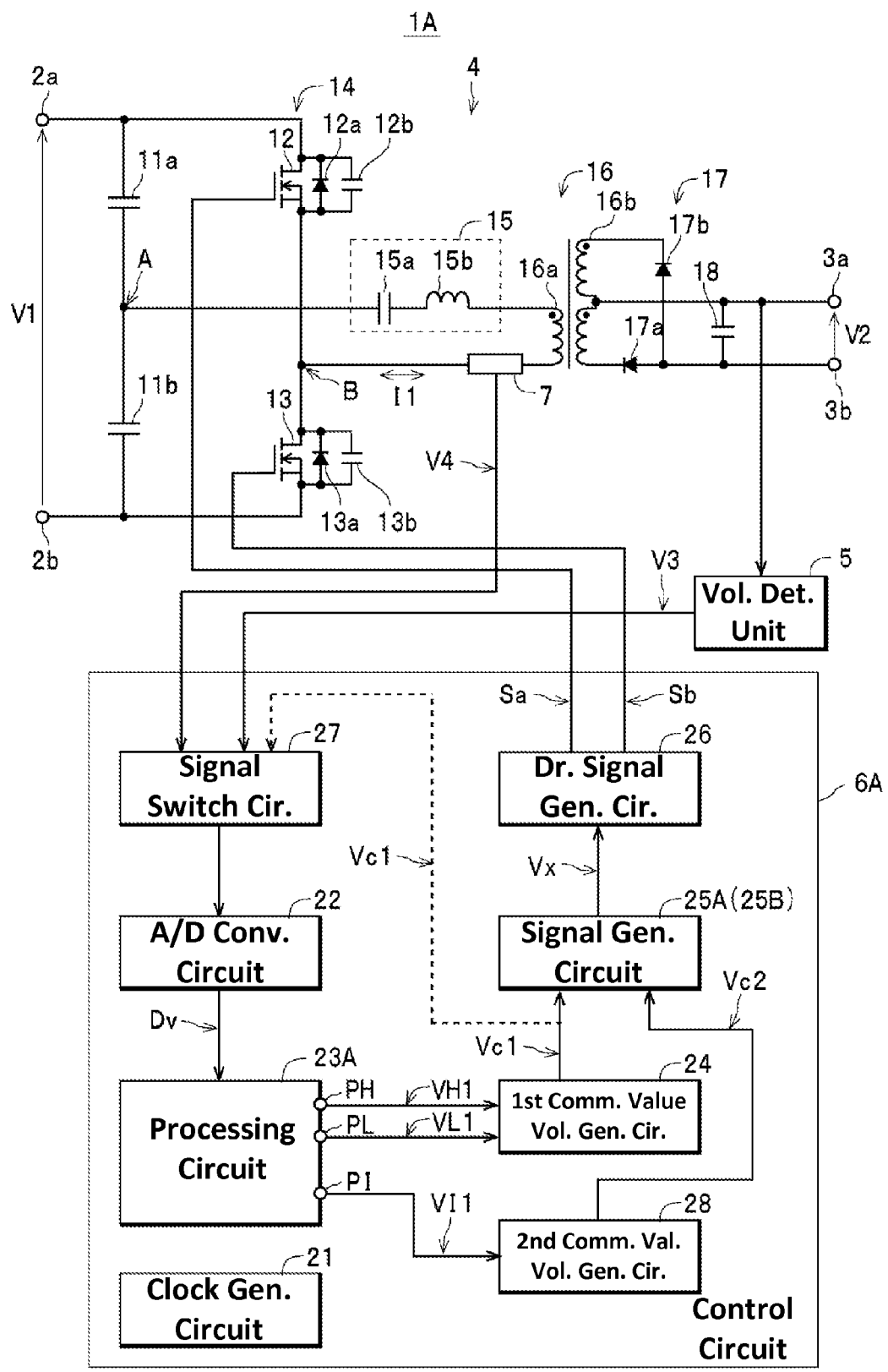
FIG. 6 is a circuit diagram of a power supply device according to an embodiment of the present invention.

Therefore, as a power supply device 1A shown in FIG. 6, a configuration, which is capable of changing the dead time, can be adopted by adding a current detection unit 7, a signal switching circuit 27 and a second command value voltage generation circuit 28 to the configuration of the power supply device 1.

The power supply device 1A according to an embodiment of the present invention is explained below with reference to the drawings. First, a configuration of the power supply device 1A is explained. A repeated explanation is omitted by attaching the same reference numerals for the same configuration as the power supply device 1.

As an example, the power supply device 1A shown in FIG. 6 is configured with an input terminal 2, an output terminal 3, a converter 4, a voltage detection unit 5, a control unit 6A and a current detection unit 7. The current detection unit 7 detects a current I1 that flows in the converter 4 (as an example in this embodiment, a current that flows in a primary side of the transformer 16). Further, the current detection unit 7 generates a voltage V4 in which a voltage value changes in proportion to a size of the detected current I1 (an absolute value of the current value) and outputs the voltage V4. The configuration that is explained below can also be adopted, though it is not shown. Specifically, in the configuration, the current detection unit 7 is located on a secondary side of the transformer 16 and detects a current that flows in the secondary side.

The control unit 6A is configured with a clock generation circuit 21, an A/D conversion circuit 22, a processing circuit 23A, a first command value voltage generation circuit 24, a signal generation circuit 25A, a driving signal generation circuit 26, a signal switching circuit 27 and a second command value voltage generation circuit 28. As explained in detail below, the voltages V3 and V4 are input to the signal switching circuit 27, and at the same time, the signal switching circuit 27 outputs one of those voltages that is selected by the processing circuit 23A to the A/D conversion circuit 22.

Figure 8:
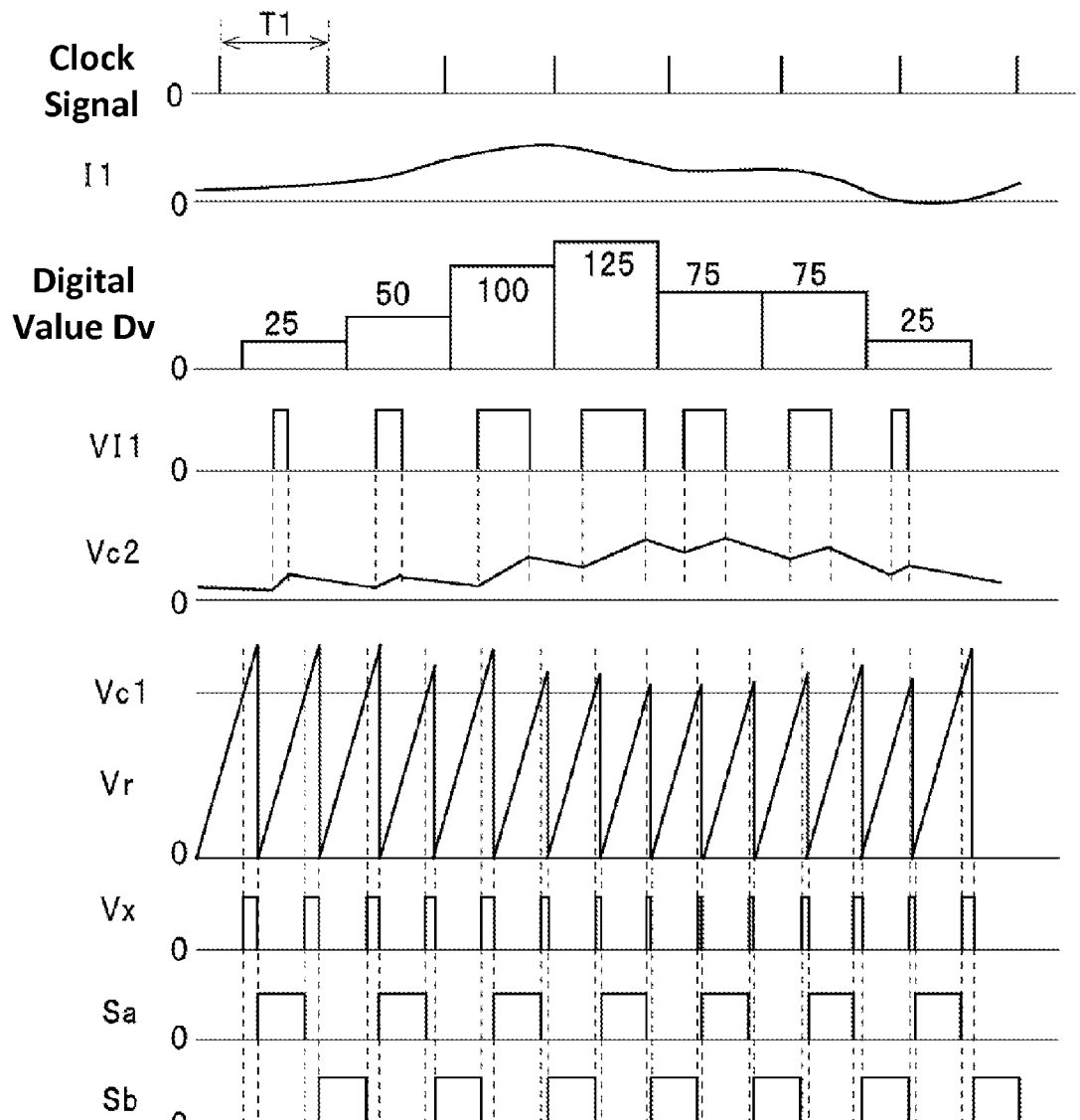
FIG. 8 is a waveform diagram to explain an operation of a power supply device according to an embodiment of the present invention.

The processing circuit 23A, in addition to processes of the processing circuit 23 in the power supply device 1 as explained above, performs a switching process of the signal switching circuit 27 and a second voltage output process. In this switching process, the processing circuit 23A switches the signal switching circuit 27 so that both of the voltages V3 and V4 are input to the A/D conversion circuit 22 and are converted to the digital values Dv within a single cycle T1 of the clock signal. As a result, when the voltage V3 is input to the A/D conversion circuit 22, the A/D conversion circuit 22 converts a voltage value of the voltage V3 into the digital value Dv at a cycle T1 and outputs the digital value Dv. Specifically, the voltage value of the voltage V3 corresponds to a voltage value of the output voltage V2. On the other hand, as shown in FIG. 8, when the voltage V4 is input to the A/D conversion circuit 22, the A/D conversion circuit 22 converts a voltage value of the voltage V4 into the digital value Dv at a cycle T1 and outputs the digital value Dv. Specifically, the voltage value of the voltage V4 corresponds to a current value of the current I1.

Further, in the second voltage output process, when the A/D conversion circuit 22 outputs the digital value Dv that corresponds to the voltage value of the voltage V4 (that is, the current value of the current I1), the digital Dv is input to the processing circuit 23A. Thereafter, the processing circuit 23A outputs a second charging and discharging voltage VI1 (refer to FIGS. 6 and 8), which is toggled from a low level to a high level, from a charge and discharge terminal PI at a cycle T1 for only an output period corresponding to the current value of the current I1 that is shown by the digital value Dv described above. The charge and discharge terminal PI is configured with an I/O port of a CPU that configures the processing circuit 23.

Figure 7:
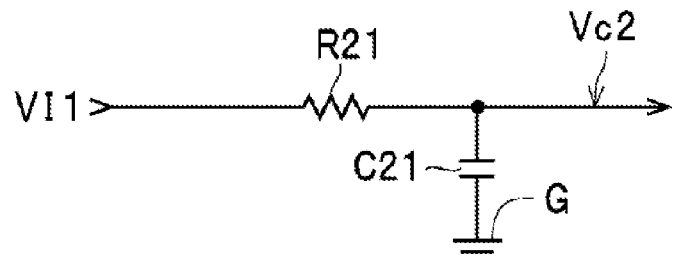
FIG. 7 is a circuit diagram of a second command value voltage generation circuit according to an embodiment of the present invention.

As an example shown in FIG. 7, the second command value voltage generation circuit 28 has a resistor R21 and a second storage element C21 (as an example in this embodiment, it is a capacitor and is also referred to as a "capacitor C21" below) that are connected to each other in series. The second command value voltage generation circuit 28 is connected between the charge and discharge terminal PI of the processing circuit 23A and a reference potential G. According to the above configuration, the capacitor 21 is charged and discharged through the resistor R21 by the second charging and discharging voltage VI1 that is output from the processing circuit 23A. Therefore, a charging voltage of the capacitor C21 changes according to a voltage value of the second charging and discharging voltage VI1 (that is, according to a current value of the current I1). Specifically, when the current value of the current I1 increases, the charging voltage of the capacitor C21 increases. When the current value of the current I1 decreases, the charging voltage of the capacitor C21 decreases. As shown in FIGS. 6, 7 and 8, the second command value voltage generation circuit 28 outputs the charging voltage of the capacitor C21 described above as a second command value voltage Vc2.

As a configuration for which the second command value voltage Vc2 is generated, a configuration that is the same as the configuration for which the first command value voltage Vc1 is generated can also be adopted. Specifically, the charge and discharge terminal PI Is divided into a charge terminal and a discharge terminal (both are not shown) and the configuration of the first command value voltage generation circuit 24 can be adopted as the second command value voltage generation circuit 28. Further, when the digital Dv that corresponds to the voltage value of the voltage V4 (that is, the current value of the current I1) is input to the processing circuit 23A, the processing circuit 23A calculates a difference value between this new digital value Dv and the previous digital value Dv. In the same manner as the charging voltage VH1 and the discharging voltage VL1 explained above, according to a polarity and a size of the calculated difference value, the processing circuit 23A outputs a charging voltage or a discharging voltage to the charge terminal or the discharge terminal. According to this configuration, charging or discharging for a capacitor of the second command value voltage generation circuit 28 can be performed by a dedicated charging voltage or a dedicated discharging voltage. As a result, responsiveness for the current value of the current I1 that is shown by the new digital value Dv of the second command value voltage Vc2 can be improved.

As shown in FIG. 3, the signal generation circuit 25A also has a resistor R15 in addition to the configuration of the signal generation circuit 25 in the power supply device 1 as explained above. The configuration of the signal generation circuit 25A is able to charge and discharge the capacitor C12 with the second command value voltage Vc2 through the resistor R15 that is connected to the capacitor C12. According to the configuration described above, when the second command value voltage Vc2 is high, the charging voltages of the capacitor C13 in addition to the charging voltage of the capacitor C12 increase. As a result, the switching element TR11 shifts from an OFF state to an ON state in a short period of time after input of the pulse signal Vx, which is output from the comparator CP11, starts. Therefore, a pulse width of the pulse signal Vx is shortened. On the other hand, when the second command value voltage Vc2 is low, the charging voltages of the capacitor C13 in addition to the charging voltage of the capacitor C12 decrease. As a result, a time period from output start time of the pulse signal Vx, which is output from the comparator CP11, until the switching element TR11 shifts from an OFF state to an ON state is prolonged. Therefore, the pulse width of the pulse signal Vx is extended.

Specifically, as shown in FIG. 8, an operation in which a voltage value of the first command value voltage Vc1, which defines a frequency of the pulse signal Vx, is constant is explained below as an example so that a relationship between the second command value voltage Vc2 and the pulse signal Vx is clear. In this case, the charging voltage Vr of the capacitor C11 reaches the first command value voltage Vc1 at the same time if a time for a completion of discharging is set as a reference point because the voltage value of the first command value voltage Vc1 is constant. Therefore, output of the pulse signal Vx starts thereafter. On the other hand, a period of time, which starts from an output start time of the pulse signal Vx until discharging of the charging voltage Vr of the capacitor C11 after the switching element TR11 shifts from an OFF state to an ON state, is controlled by the second command value voltage Vc2 in which the voltage value is proportional to the current value of the current I1 as explained above. Specifically, when the second command value voltage Vc2 is low (that is, the current value of the current I1 is small), the period of time becomes long. On the other hand, when the second command value voltage Vc2 is high (that is, the current value of the current I1 is large), the period of time becomes short.

As a result, as shown in FIG. 8, the driving signal generation circuit 26 generates the pair of driving signals Sa and Sb in a state in which a signal level of the driving signals Sa and Sb is toggled in synchronization with the pulse signal Vx, in which a frequency of the driving signals Sa and Sb is a half of a frequency of the pulse signal Vx, and in which a dead time (an output stop period) corresponding to a pulse width of the pulse signal Vx is provided in both driving signals Sa and Sb. Then, the driving signal generation circuit 26 outputs the pair of driving signals Sa and Sb to the corresponding switching elements 12 and 13 of the switching circuit 14. Further, a pulse width of the pulse signal Vx is controlled according to the current value of the current I1 as explained above. Therefore, when the second command value voltage Vc2 increases, the driving signal generation circuit 26 shortens the length of the dead time (the output stop period) between the pair of driving signals Sa and Sb. When the second command value voltage Vc2 decreases, the driving signal generation circuit 26 extends the length of the dead time.

In an embodiment as shown in FIG. 8, a ratio of the pulse width of the pulse signal Vx relative to each pulse width of the driving signals Sa and Sb is large in order to make a comprehension of the present invention easy. In reality, however, as described above, the dead time that is defined by the pulse width of the pulse signal Vx is adequately small relative to each pulse width of the driving signals Sa and Sb. Further, in FIG. 8, it is described that according to a change of the second command value voltage Vc2, a peak value of the ramp waveform that shows a change of the charging voltage Vr greatly changes. It is also described that, as a result, the frequency of the pulse signal Vx greatly changes. In reality, however, the change of this frequency is small. Therefore, the pair of driving signals Sa and Sb are output by a substantially constant frequency, and at the same time, by a substantially constant duty ratio.

Thus, in the same manner as the power supply device 1 described above, the power supply device 1A according to the embodiment of the present invention controls the output voltage V2 to be a target voltage based on a digital value Dv that corresponds to the voltage value of the voltage V3 that is output to the A/D conversion circuit 22 after being switched by the signal switching circuit 27. The voltage value of the voltage V3 corresponds to the voltage value of the output voltage V2. Further, when the current value of the current I1 that flows in the converter 4 increases, the power supply device 1A can shorten a length of the dead time of the driving signals Sa and Sb according to the increased current value. In contrast, when the current value of the current I1 decreases, the power supply device 1A can extend the length of the dead time according to the decreased current value. As a result, the efficiency of the converter 4 can be improved.

Figure 9:
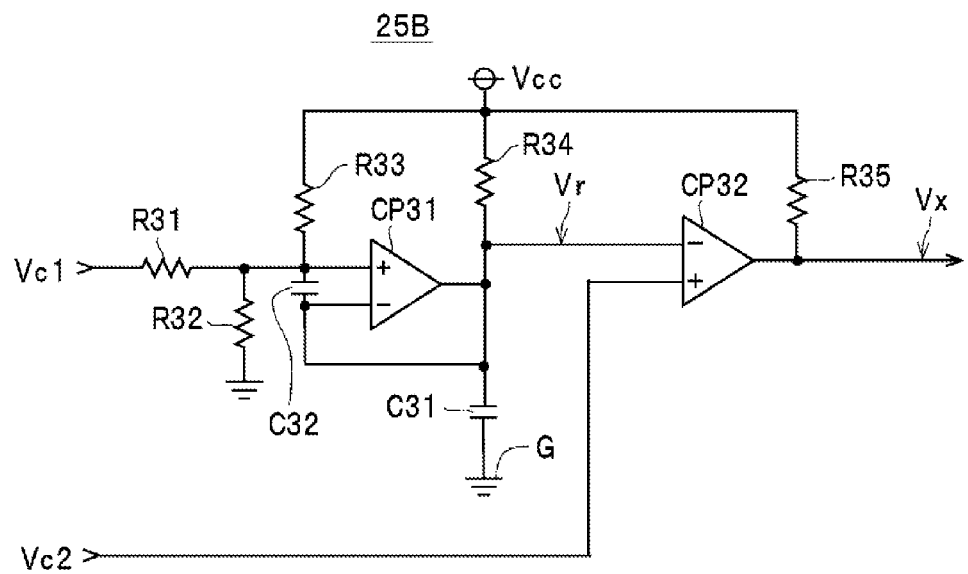
FIG. 9 is a circuit diagram of a signal generation circuit according to an embodiment of the present invention.

Further, a signal generation circuit 25B shown in FIG. 9 can be adopted instead of the signal generation circuit 25A in the power supply device 1A as explained above.

The signal generation circuit 25B is configured with two comparators CP31, CP32, five resistors R31, R32, R33, R34, R35 and two capacitors C31, C32. This configuration of the signal generation circuit 25B is able to generate a pulse signal Vx in which a frequency corresponds to a voltage value of the first command value voltage Vc1 and in which a pulse width corresponds to a voltage value of the second command value voltage Vc2.

Specifically, the resistor R33 is connected between a non-inverting input terminal of the comparator CP31, which is located at a preceding stage in the comparators CP31 and CP32, and the power supply Vcc. The resistor R32 is connected between the non-inverting input terminal described above and a reference potential G. Further, the resistor R34 is connected between the output terminal of the comparator CP31 and the power supply Vcc. The capacitor C31 is connected between this output terminal and the reference potential G. Further, this output terminal is connected to the non-inverting input terminal. The capacitor C32 is connected between the non-inverting input terminal and the inverting input of the comparator CP31. The first command value voltage Vc1 is supplied to a node connected between the two resistors R33 and R32 (the non-inverting input terminal of the comparator CP31) through the resistor R31. A circuit including this comparator CP31 configures a ramp waveform generation circuit. When the power supply Vcc starts up, the two resistors R33 and R32 divide a voltage of the power supply Vcc and the divided voltage is input to the non-inverting input terminal of the comparator CP31. As a result, the circuit including the comparator CP31 described above outputs a ramp voltage Vr in which a frequency corresponds to the divided voltage of the power supply Vcc. Thereafter, when the first command value voltage Vc1 is input through the resistor R31, a voltage that is input to the non-inverting input terminal changes according to a voltage value of the first command value voltage Vc1. Therefore, as shown in FIG. 10, the configuration of the circuit including the comparator CP31 is able to control a frequency of the ramp voltage Vr by a voltage value of the first command value voltage Vc1.

The ramp voltage Vr is input to a non-inverting input terminal of the comparator CP32, which is located at a following stage in the comparators CP31 and CP32. The second command value voltage Vc2 is input to a non-inverting input terminal of the comparator CP32. Further, the resistor 35 is connected between an output terminal of the comparator CP32 and the power supply Vcc. In this configuration, as shown in FIG. 10, the comparator CP32 generates the pulse signal Vx in which a pulse width changes according to a voltage value of the second command value voltage Vc2 and in which a frequency corresponds to a frequency of the ramp voltage Vr (that is, a frequency that is defined by the first command value voltage Vc1). Further, in the configuration as shown in FIG. 9, the pulse width of the pulse signal Vx changes according to the voltage value of the second command value voltage Vc2 as shown in FIG. 10. Specifically, when this voltage value of the second command value voltage Vc2 decreases, the pulse width of the pulse signal Vx is shortened. When this voltage value of the second command value voltage Vc2 increases, the pulse width of the pulse signal Vx is extended. Therefore, this operation is opposite from the operation of the signal generation circuit 25A shown in FIG. 3.

Figure 10:
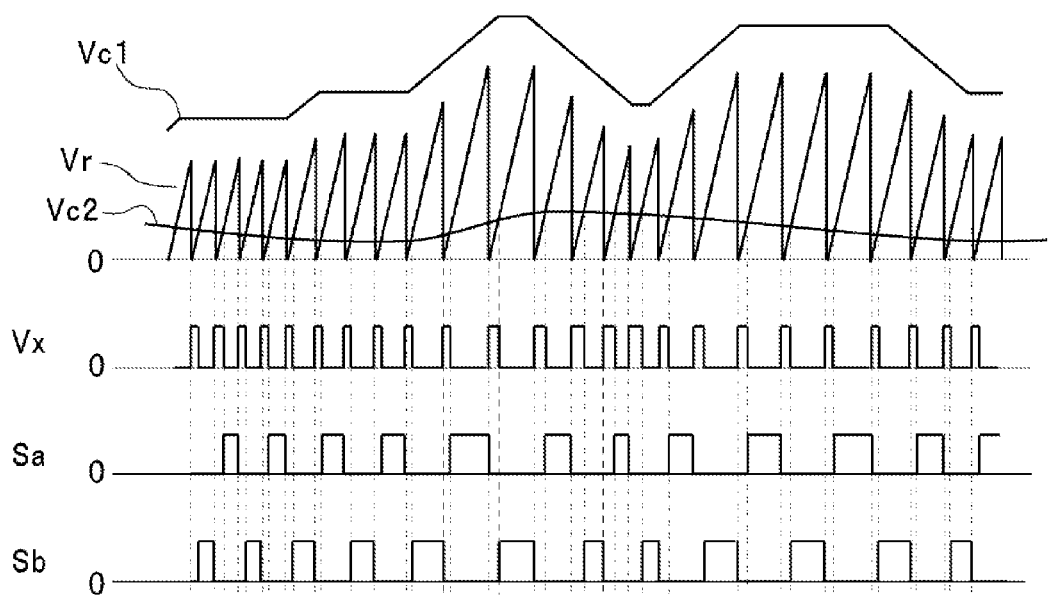
FIG. 10 is a waveform diagram to explain an operation of a power supply device that has a signal generation circuit according to an embodiment of the present invention.

Further, also in an embodiment as shown in FIG. 10, a ratio of the pulse width of the pulse signal Vx relative to each pulse width of the driving signals Sa and Sb is large in order to make a comprehension of the present invention easy. In reality, however, as described above, the dead time that is defined by the pulse width of the pulse signal Vx is sufficiently small relative to each pulse width of the driving signals Sa and Sb. Therefore, in FIG. 10, it is described that according to a change of the second command value voltage Vc2, a peak value of the ramp waveform that shows a change of the charging voltage Vr greatly changes. It is also described that, as a result, the frequency of the pulse signal Vx greatly changes. In reality, however, the change of this frequency is small. Therefore, the pair of driving signals Sa and Sb is output by a substantially constant frequency, and at the same time, by a substantially constant duty ratio.

Therefore, in the power supply device 1A in which the signal generation circuit 25B is adopted, in the second voltage output process, when a digital value Dv that corresponds to a current value of the current I1 is input to the processing circuit 23A, first, the processing circuit 23A calculates a new digital value Dv based on the digital value Dv described above. Specifically, when the digital value Dv increases, the new digital value Dv decreases. Similarly, when the digital value Dv decreases, the new digital value Dv increases. Next, the processing circuit 23A outputs the second charging and discharging voltage VI1 from the charge and discharge terminal PI at a cycle T1 for only an output period corresponding to a value that corresponds to this new digital value Dv. Specifically, the second charging and discharging voltage VI1 is toggled from a low level to a high level. Thus, as the same manner in the configuration in which the signal generation circuit 25 A is adopted, in the power supply device 1A as explained above, when a current value of the current I1 that flows in the converter 4 increase, the dead time of the driving signals Sa and Sb is shortened according to the increased current value. In contrast, when the current value of the current I1 decreases, the dead time can be extended according to the decreased current value. Therefore, the efficiency of the converter 4 can be improved.

Further, though it is not shown, the signal generation circuit 25B shown in FIG. 9 can perform the same operation as the signal generation circuit 25 by a configuration that will be explained below. Specifically, a reference voltage in which a voltage value is constant, instead of the second command value voltage Vc2, is input to the non-inverting input terminal of the comparator CP32 that is located at the following stage in the signal generation circuit 25B. Therefore, the signal generation circuit 25B that has the configuration explained below can be used instead of the signal generation circuit 25 in the power supply device 1 as well. Specifically, in the configuration, the reference voltage described above is input to the non-inverting input terminal of the comparator CP32 that is located at the following stage.

In the power supply devices 1 and 1A that have the current resonance type converter 4, a frequency of the driving signals Sa and Sb (a switching frequency of the switching circuit 14) is changed to a range of frequencies that are higher than a resonant frequency of the converter 4. As a result, the PFM control is performed for the converter 4. Therefore, it is not preferred that the frequency of the driving signals Sa and Sb (a switching frequency of the switching circuit 14) decreases below the range of frequencies. Further, as explained above, the frequency of the driving signals Sa and Sb, i.e., the frequency of the pulse signal Vx, decreases when the first command value voltage Vc1 is high. Therefore, a configuration in which the control units 6 and 6A have a limit circuit which limits an upper limit of this first command value voltage Vc1 can also be adopted.

Figure 11:
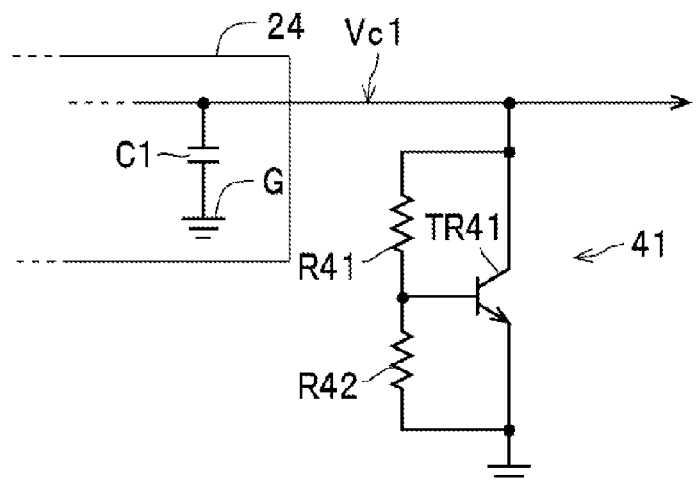
FIG. 11 is a circuit diagram of a limit circuit according to an embodiment of the present invention.
Figure 12:
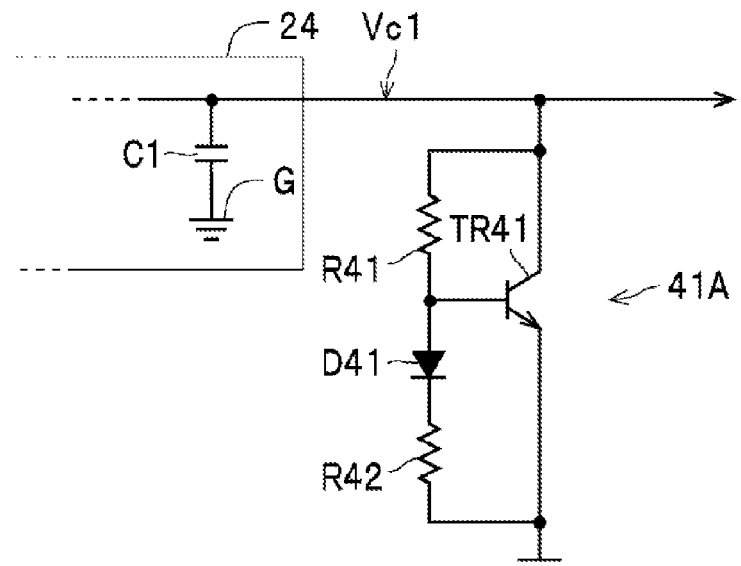
FIG. 12 is a circuit diagram of a limit circuit according to an embodiment of the present invention.
Figure 13:
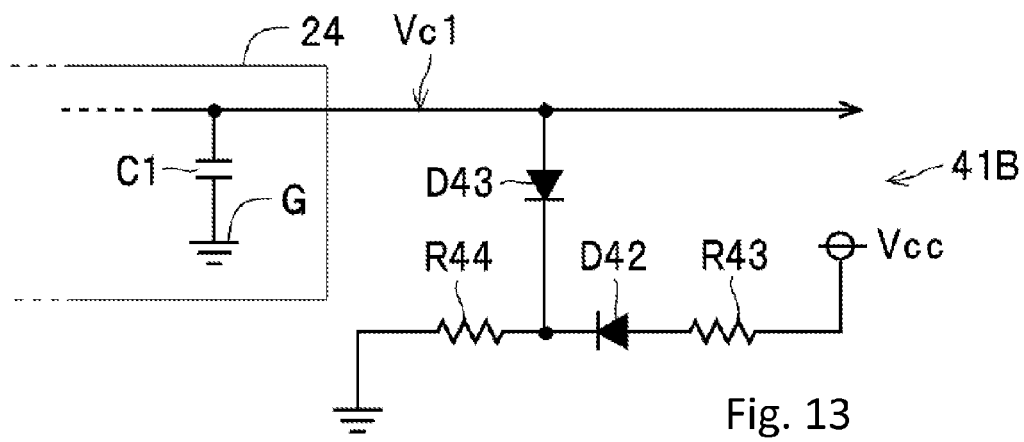
FIG. 13 is a circuit diagram of a limit circuit according to an embodiment of the present invention.

Specifically, as the limit circuit in the control units 6 and 6A, a limit circuit 41 shown in FIG. 11, a limit circuit 41A shown in FIG. 12 and a limit circuit 41B shown in FIG. 13 are used. Specifically, the limit circuit 41 is configured with a transistor TR41 (an npn type bipolar transistor) and two resistors R41, R42 shown in FIG. 11. The limit circuit 41A is configured with the transistor TR41, the two resistors R41, R42 and a diode D41 shown in FIG. 12. The limit circuit 41B is configured with two resistors R43, R44 and two diodes D42, D43 shown in FIG. 13. Further, one of the limit circuits 41, 41A, 41B explained above is connected to an output line of the first command value voltage Vc1 of the command voltage generation circuit 24. As a result, the upper limit of the first command value voltage Vc1, i.e., the upper limit of the switching frequency, is limited. Further, a diode itself can also be used as a limit circuit though it is not shown. In this case, the output line of the first command value voltage Vc1 is connected to the power supply Vcc through the diode described above. The first command value voltage Vc1 is limited by setting a voltage value of the power supply Vcc as an upper limit. Therefore, according to the power supply devices 1 and 1A including the limit circuit discussed above, a lower limit for a frequency of the driving signals Sa and Sb (the switching frequency of the switching circuit 14) can certainly be maintained within a range of frequencies of the PFM control with respect to the converter 4.

Figure 14:
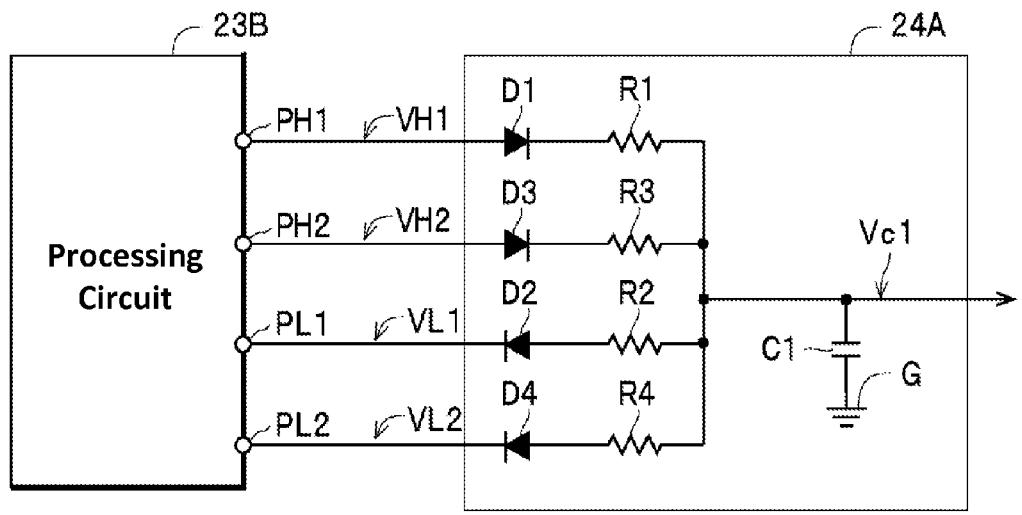
FIG. 14 is a circuit diagram of a processing circuit and a first command value voltage generation circuit according to an embodiment of the present invention.

Further, in the power supply devices 1 and 1A that are explained above, the command value voltage generation circuit 24 has the configuration in which the first command value voltage Vc1 is generated by charging and discharging the capacitor C1 by one charging voltage VH1 and one discharging voltage VL1 shown in FIG. 2. However, another configuration, in which the first command value voltage Vc1 is generated by charging and discharging the capacitor C1 by a plurality of (two in this embodiment) charging voltages VH (VH1 and VH2) and a plurality of (two in this embodiment) discharging voltages VL (VL1 and VL2), can also be adopted as a command value voltage generation circuit 24A shown in FIG. 14. The command value voltage generation circuit 24A has a series circuit of a diode D3 and a resistor R3 and a series circuit of a diode D4 and a resistor R4 in addition to the configuration of the command value voltage generation circuit 24. Specifically, the command value voltage generation circuit 24 described above has a series circuit of the diode D1 and the resistor R1 and a series circuit of the diode D2 and the resistor R2. Further, resistance values of the resistors R1 and R3 are defined as different values with each other (for instance, a resistance value of the resistor R1> a resistance value of the resistor R3). Similarly, resistance values of the resistors R2 and R4 are defined as different values with each other (for instance, a resistance value of the resistor R2> a resistance value of the resistor R4).

Further, a configuration of a processing circuit 23B corresponds to the configuration of the command value voltage generation circuit 24A. Specifically, a plurality of charging voltages VH (VH1, VH2) and a plurality of discharging voltages VL (VL1, VL2) are input to the command value voltage generation circuit 24A. Thus, the processing circuit 23 B has a plurality of charging terminals (PH1, PH2) that are equal in number as the charging voltages VH (VH1, VH2) and a plurality of discharging terminals (PL1, PL2) that are equal in number as the discharging voltages VL (VL1, VL2).

According to the configuration explained above, the processing circuit 23B can rapidly charge the capacitor C1 of the command value voltage generation circuit 24A in the fastest manner by outputting the charging voltages VH1 and VH2 from the two charging terminals PH1 and PH2 at the same time. The processing circuit 23B can also rapidly charge the capacitor C1 of the command value voltage generation circuit 24A in the secondly fastest manner through the resistor R3 in which a resistance value is smaller by outputting only the charging voltage VH2 from the charging terminal PH2. Further, the processing circuit 23B can also rapidly charge the capacitor C1 of the command value voltage generation circuit 24A in the thirdly fastest manner through the resistor R1 in which the resistance value is larger by outputting only the charging voltage VH1 from the charging terminal PH1.

On the other hand, the processing circuit 23B can rapidly discharge the capacitor C1 of the command value voltage generation circuit 24A the fastest manner by outputting the discharging voltages VL1 and VL2 from the two discharging terminals PL1 and PL2 at the same time. The processing circuit 23B can also rapidly discharge the capacitor C1 of the command value voltage generation circuit 24A in the secondly fastest manner through the resistor R4 in which the resistance value is smaller by outputting only the discharging voltage VL2 from the discharging terminal PL2. Further, the processing circuit 23B can also rapidly discharge the capacitor C1 of the command value voltage generation circuit 24A in the thirdly fastest manner through the resistor R2 in which the resistance value is larger by outputting only the discharging voltage VL1 from the discharging terminal PL1. According to the configuration described above, the processing circuit 23B can finely control inclines at times of rising or falling of the first command value voltage Vc1 that corresponds to the charging voltage for the capacitor C1. As a result, the processing circuit 23B can change the frequency of the pulse signal Vx that is controlled by the first command value voltage Vc1, i.e., the frequency of the driving signals Sa and Sb (the switching frequency of the converter 4), more smoothly.

Figure 15:
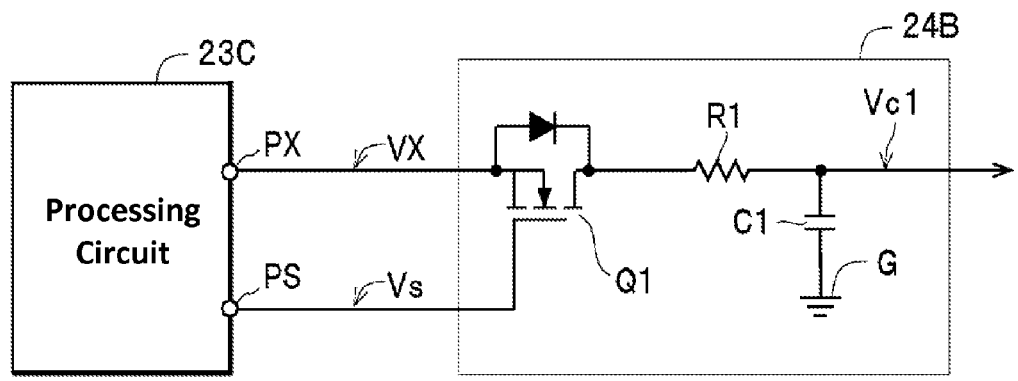
FIG. 15 is a circuit diagram of a processing circuit and a first command value voltage generation circuit according to an embodiment of the present invention.

Further, the command value voltage generation circuit 24 in the power supply devices 1 and 1A as explained above can be configured with a command value voltage generation circuit 24B shown in FIG. 15. The command value voltage generation circuit 24B has a configuration of charging and discharging a capacitor C1 through a series circuit of one switching element Q1 and one resistor R1. As an embodiment, the switching element Q1 is configured with an N channel MOSFET that has a body diode. In this case, a drain terminal of the switching element Q1 is connected to the capacitor C1 through a resistor R1. A source terminal of the switching element Q1 is connected to a charge and discharge terminal PX that is provided in a processing circuit 23C. Further, a gate terminal of the switching element Q1 is connected to a control terminal PS that is provided at the processing circuit 23C. Further, the switching element Q1 can also use a P channel MOSFET or a bipolar transistor.

In the configuration shown in FIG. 15, the processing circuit 23C calculates a difference value between a new first control command value described above and the previous first control command value that is read from a memory every cycle T1. Further, when a polarity of the calculated difference value is positive, the processing circuit 23C outputs a high level voltage (a charging and discharging voltage VX) from a charge and discharge terminal PX and outputs a high level voltage (a control voltage Vs) from a control terminal PS for only an output period corresponding to a size of an absolute value of the difference value (a period less than the cycle T1). As a result, because the switching element Q1 shifts to an ON state, the capacitor C1 is charged by the charging and discharging voltage VX that is at a high level described above through the resistor R1. That is, the first command value voltage Vc1 increases. In this case, even when the switching element Q1 does not shift to the ON state, the capacitor C1 can be charged through the body diode. However, it is preferred that the switching elements Q1 shifts to the ON state in consideration of a power loss by the body diode.

Further, when a polarity of the calculated difference value is negative, the processing circuit 23C outputs a high level voltage (a control voltage Vs) from the control terminal PS for only the output period corresponding to a size of the difference value while a low level voltage (a charging and discharging voltage VX) is output from the charge and discharge terminal PX. As a result, because the switching element Q1 shifts to the ON state, the capacitor C1 is discharged through the resistor R1 and the switching element Q1 that is in the ON state. That is, the first command value voltage Vc1 decreases. Further, in regards to the output period of the high level voltage that is output from the control terminal PS (that is, an ON period of the switching element Q1), the larger the absolute value of the difference value becomes, the more the output period is lengthened. The smaller the absolute value of the difference value becomes, the more the output period is shortened. Further, when the calculated difference value is zero, the processing circuit 23C outputs a low level voltage (the charging and discharging voltage VX) from the charge and discharge terminal PX and outputs a low level voltage (the control voltage Vs) from the control terminal PS. In this case, because the switching element Q1 and the body diode of the switching element Q1 result in an OFF state, the charging and discharging operations for the capacitor C1 is stopped. That is, a voltage value of the first command value voltage Vc1 is on hold. According to the configuration as explained above, the processing circuit 23C can change a frequency of the driving signals Sa and Sb (a switching frequency of the converter 4) by controlling a voltage value of the first command value voltage Vc1.

Further, in the power supply device 1A in which the signal switching circuit 27 is provided as shown in FIG. 6, another configuration that will be explained below can be adopted. As shown by a broken line in FIG. 6, the first command value voltage Vc1 is input to the signal switching circuit 27. Further, the processing circuit 23A inputs the first command value voltage Vc1 to the A/D conversion circuit 22 by controlling the signal switching circuit 27. Further, the processing circuit 23A can obtain a digital value Dv that corresponds to a voltage value of the first command value voltage Vc1. According to this configuration, the processing circuit 23A can detect an actual frequency of the driving signals Sa and Sb (the switching frequency of the converter 4) based on the obtained digital value Dv that corresponds to the voltage value of the first command value voltage Vc1. Therefore, the processing circuit 23A can accurately control a frequency of the driving signals Sa and Sb (the switching frequency of the converter 4) to be a desired frequency by changing the charging voltage VH1 and the discharging voltage VL1 based on the detected actual frequency.

Further, in the power supply devices 1 and 1A as explained above, the configuration in which the converter 4 has a plurality of switching elements (switching elements 12 and 13) is adopted. However, as a power supply device 1B shown in FIG. 16, a converter 4A that has one switching element 12 can also be used. The power supply device 1B according to an embodiment of the present invention is explained below. Further, in this embodiment, the converter 4A is configured with a non-insulated type step-up converter that does not use a transformer. However, the converter 4A can be configured with a non-insulated type step-down converter, an insulated forward-type converter that uses a transformer or an insulated flyback converter. A repeated explanation is omitted by using the same reference numerals for the same configuration as the power supply device 1.

Figure 16:
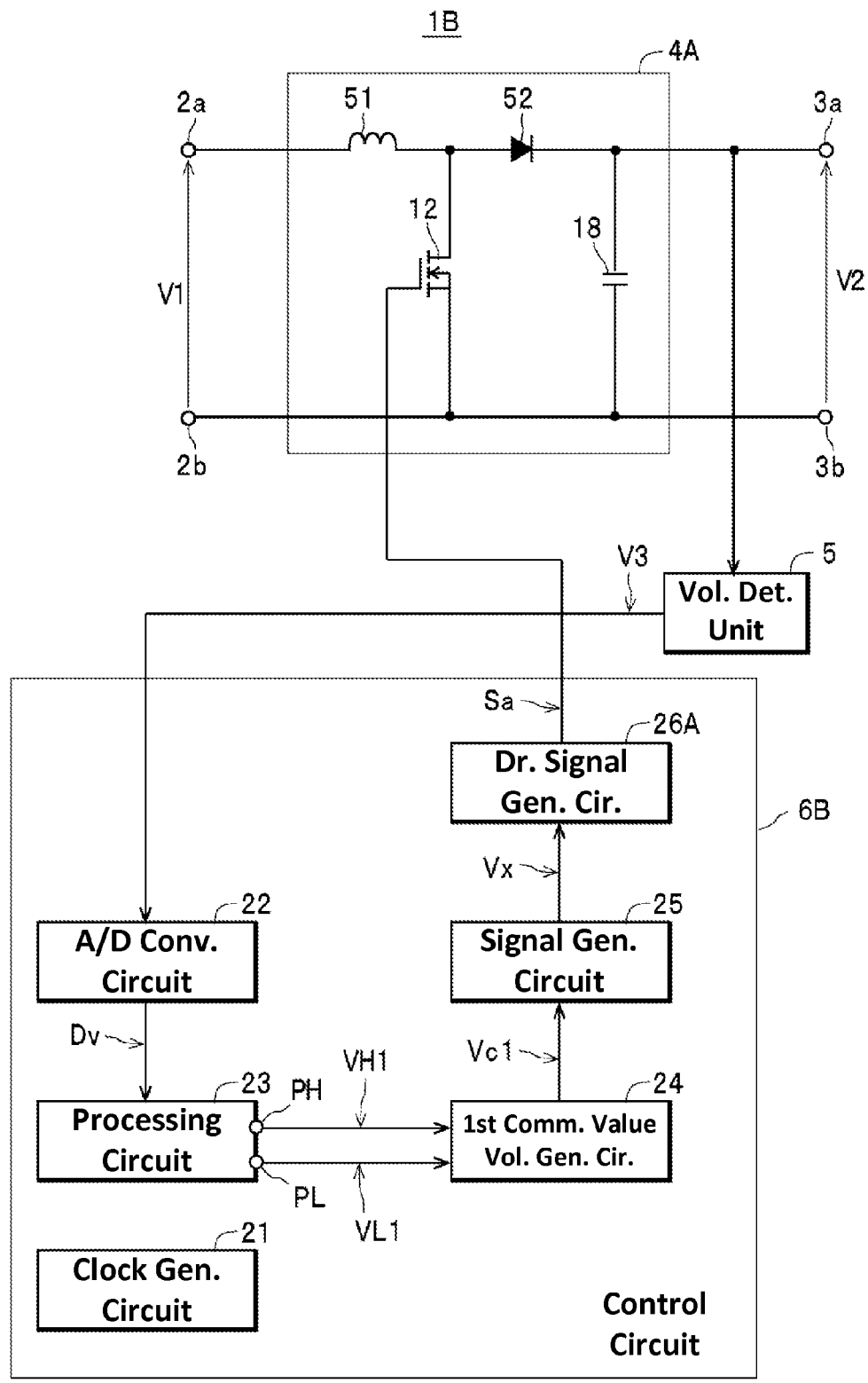
FIG. 16 is a circuit diagram of a power supply device according to an embodiment of the present invention.

As shown in FIG. 16, the power supply device 1B is configured with an input terminal 2, an output terminal 3, the converter 4A, a voltage detection unit 5 and a control unit 6B. The power supply device 1B converts an input voltage (a DC voltage) V1, which is input to the input terminal 2, into an output voltage (a DC voltage) V2 and outputs the outputs voltage V2 from the output terminal 3. At the same time, the power supply device 1B controls the output voltage V2 to be a target voltage that is defined in advance.

As an example, the converter 4A has a switching element 12, a choke coil 51, a diode 52 and an output capacitor 18 and is configured with the non-insulated type step-up converter as explained above.

The control unit 6B converts a voltage value of an output voltage V2 (in this embodiment, a voltage value of a voltage V3 corresponds to the voltage value of the output voltage V2) that is detected by the voltage detection unit 5 into a digital value. At the same time, the control unit 6B calculates a first control command value, which defines an operating frequency of the switching element 12 based on the converted digital value by digital arithmetic. Further, the control unit 6B performs PFM control (specifically, a constant on-time control) relative to the switching elements 12 by outputting the driving signal Sa to the switching element 12.

Specifically, as an example, the control unit 6B is configured with a clock generation circuit 21, an A/D conversion circuit 22, a processing circuit 23, a first command value voltage generation circuit 24, a signal generation circuit 25 and a driving signal generation circuit 26A. In this case, in the configuration of the driving signal generation circuit 26A is, for instance, provided with a mono-stable multi-vibrator (not shown). Thus, the driving signal generation circuit 26A outputs a pulse signal in which a pulse width is defined in advance as a driving signal Sa only one time when a pulse signal Vx is input to the driving signal generation circuit 26A. According to this configuration explained above, the driving signal generation circuit 26A generates the driving signal Sa in which an ON period is constant by a frequency of the pulse signal Vx and outputs the driving signal Sa.

Further, the processing circuit 23 of the power supply device 1B is different from the power supply device 1 having the converter 4 that functions as a current resonance type DC-DC converter. Specifically, when a polarity of the calculated difference value (=a new first control command value−a previous first control command value) described above is positive, the processing circuit 23 in the power supply device 1B outputs a discharging voltage VL1, which is at a low level voltage, as a first charging and discharging voltage from a discharging terminal PL for only an output period (a period less than the cycle T1) corresponding to a size of the difference value (an absolute value of the difference value). Specifically, the discharging terminal PL outputs a high level voltage in a normal condition. On the other hand, when the polarity of the difference value is negative, the processing circuit 23 outputs a charging voltage VH1, which is at a high level voltage, as the first charging and discharging voltage from a charging terminal PH for only the output period (a period less than the cycle T1) corresponding to a size of the difference value (an absolute value of the difference value). Specifically, the charging terminal PH outputs a low level voltage in a normal condition. Further, the difference value is zero, the processing circuit 23 stops output of the charging voltage VH1 and the discharging voltage VL1. Thus, the processing circuit 23 outputs either one of the corresponding charging voltage VH1 and the corresponding discharging voltage VL1 from either one of the charging terminal PH and the discharging terminal PL according to the polarity of the difference value for only the output period that is less than the cycle T1.

Thus, in regards to generation operations for the charging voltage VH1 and the discharging voltage VL1, the processing circuit 23 in the power supply device 1B performs opposite to the power supply device 1. Therefore, the first command value voltage Vc1, which is generated by the first command value voltage generation circuit 24 based on the charging voltage VH1 and the discharging voltage VL1, is controlled to decrease when the voltage value of the output voltage V2 is less than a voltage value of a target voltage. When the voltage value of the output voltage V2 is more than the voltage value of the target voltage, the first command value voltage Vc1 is controlled to increase. Further, the voltage value of the output voltage V2 is the same as the voltage value of the target voltage, the first command value voltage Vc1 is controlled to be constant.

As a result, a frequency of the pulse signal Vx that is output from the signal generation circuit 25, i.e., a frequency of the driving signal Sa that is output from the driving signal generation circuit 26A, is controlled to increase when the voltage value of the output voltage V2 is less than the voltage value of the target voltage. The frequency of the pulse signal Vx (the frequency of the driving signal Sa) described above is controlled to decrease when the voltage value of the output voltage V2 is more than the voltage value of the target voltage. Further, the frequency of the pulse signal Vx (the frequency of the driving signal Sa) described above is controlled to be constant when the voltage value of the output voltage V2 is the same as the voltage value of the target voltage. As a result, a duty ratio of the driving signal Sa in which an ON period is constant is controlled to increase when the voltage value of the output voltage V2 is less than the voltage value of the target voltage. The duty ratio of the driving signal Sa described above is controlled to decrease when the voltage value of the output voltage V2 is more than the voltage value of the target value. Further, the duty ratio of the driving signal Sa described above is controlled to be constant when the voltage value of the output voltage V2 is the same as the voltage value of the target voltage. Therefore, the control unit 6B in the power supply device 1B controls the output voltage V2 of the converter 4A to be the target voltage.

In the same manner as the power supply device 1, the power supply device 1B explained above according to the embodiment of the present invention can change the frequency of the driving signal Sa for the switching element 12 in the stepless manner. That is, the power supply device 1B makes an adjustment unit finer for the frequency of the driving signal Sa. At the same time, the power supply device 1B can decrease each operating frequency of the clock generation circuit 21, the A/D conversion circuit 22 and the processing circuit 23, which are configured as digital circuits, to be a minimum frequency. The above minimum frequency (8 MHz in the embodiment) corresponds to a frequency in which a generation time of the charging voltage VH1 and the discharging voltage VL1, which are generated by the processing circuit 23, can be in time for the operating frequency (31.25 kHz) of a control loop of the power supply device 1B. The power supply device 1B explained above can operate the digital circuit by an adequately low-speed frequency (such as 8 MHz). As a result, the use of high-speed electric parts can be avoided.

The power supply device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:
1. A power supply device, comprising:
two switching elements;
a converter that supplies electric power by ON and OFF operations of the two switching elements;
a voltage detection unit that detects an output voltage of the converter; and
a control unit that performs PFM (Pulse Frequency Modulation control for the switching elements, wherein
the control unit comprises:
an A/D conversion circuit that converts the output voltage to a voltage digital value;
a processing circuit that:
calculates a first control command value based on the voltage digital value,
calculates a new first control command value by adjusting the output voltage to a target voltage,
calculates a difference value between the first control command value and the new first control command value, and
outputs a first charging and discharging voltage, which has a polarity corresponding to the difference value, for a first output period corresponding to the difference value at a first predetermined cycle;
a first command value voltage generation circuit that has a first storage element, which is charged by the first charging and discharging voltage for the first output period when the first charging and discharging voltage is at a high level and which is discharged by the first charging and discharging voltage for the first output period when the first charging and discharging voltage is at a low level, a first charging voltage for the first storage element is varied in accordance with the new first control command value, the first command value voltage generation circuit outputs the first charging voltage as a first command value voltage;
a signal generation circuit that generates a pulse signal in which a frequency increases or decreases in accordance with a voltage value of the first command value voltage; and
a driving signal generation circuit that generates a pair of toggle signals, which toggle a signal level so that each phase of the toggle signals are opposite in synchronization with an input of the pulse signal and that outputs the toggle signals as a pair of driving signals for the two switching elements.
2. The power supply device according to claim 1, further comprising:
a current detection unit that detects a current of the converter, wherein
the control unit has a second command value voltage generation circuit,
the A/D conversion circuit converts a current value of the current detected by the current detection unit to a current digital value, the processing circuit outputs a second charging and discharging voltage at a second predetermined cycle, the second charging and discharging voltage toggles from the low level to the high level for a second output period corresponding to the current digital value, the second command value voltage generation circuit has a second storage element, which is charged by the second charging and discharging voltage for the second output period when the second charging and discharging voltage is at the high level and which is discharged by the second charging and discharging voltage for the second output period when the second charging and discharging voltage is at the low level, a second charging voltage for the second storage element is varied in accordance with the current value, the second command value voltage generation circuit outputs the second charging voltage as a second command value voltage;

the driving signal generation circuit shortens an output stop period between the pair of driving signals when the second command value voltage increases, the driving signal generation circuit elongates the output stop period when the second command value voltage decreases.

3. The power supply device according to claim 1, wherein the control unit includes a limit circuit that controls an upper limit value of the first charging voltage.

4. A power supply device, comprising:
a switching element;
a converter that supplies electric power by on and off operations of the switching element;
a voltage detection unit that detects an output voltage of the converter; and
a control unit that performs PFM (Pulse Frequency Modulation control for the switching element, wherein
the control unit comprises:
an A/D conversion circuit that converts the output voltage to a voltage digital value;
a processing circuit that:
  calculates a control command value based on the voltage digital value,
  calculates a new control command value by adjusting the output voltage to a target voltage,
  calculates a difference value between the control command value and the new control command value, and
  outputs a charging and discharging voltage, which has a polarity corresponding to the difference value, for an output period corresponding to the difference value at a predetermined cycle;
a command value voltage generation circuit that has a storage element, which is charged by the charging and discharging voltage for the output period when the charging and discharging voltage is at a high level and which is discharged by the charging and discharging voltage for the output period when the charging and discharging voltage is at a low level, a charging voltage for the storage element is varied in accordance with the new control command value, the command value voltage generation circuit outputs the charging voltage as a command value voltage;
a signal generation circuit that generates a pulse signal in which a frequency increases or decreases in accordance with a voltage value of the command value voltage; and
a driving signal generation circuit that generates a driving signal for driving the switching element, the driving signal has the same frequency as the pulse signal, and a pulse width of the driving signal is constant.

* * * * *